(12) United States Patent
Matsumura et al.

(10) Patent No.: US 10,548,138 B2
(45) Date of Patent: Jan. 28, 2020

(54) USER TERMINAL, RADIO BASE STATION AND RADIO COMMUNICATION METHOD USING SIGNALS MULTIPLEXED IN THE POWER DOMAIN

(71) Applicant: NTT DOCOMO, INC., Tokyo (JP)

(72) Inventors: Yuki Matsumura, Tokyo (JP); Yousuke Sano, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/761,908

(22) PCT Filed: Sep. 8, 2016

(86) PCT No.: PCT/JP2016/076390
§ 371 (c)(1),
(2) Date: Mar. 21, 2018

(87) PCT Pub. No.: WO2017/051712
PCT Pub. Date: Mar. 30, 2017

(65) Prior Publication Data
US 2018/0270829 A1 Sep. 20, 2018

(30) Foreign Application Priority Data
Sep. 24, 2015 (JP) .................... 2015-186886

(51) Int. Cl.
*H04W 72/04* (2009.01)
*H04W 52/34* (2009.01)
(Continued)

(52) U.S. Cl.
CPC ....... *H04W 72/0473* (2013.01); *H04L 5/0053* (2013.01); *H04L 5/0073* (2013.01);
(Continued)

(58) Field of Classification Search
CPC . H04W 52/24; H04W 52/244; H04W 52/248; H04W 52/42; H04W 72/04;
(Continued)

(56) References Cited

U.S. PATENT DOCUMENTS

| 8,644,292 B2 | 2/2014 | Gorokhov et al. |
| 2007/0047485 A1* | 3/2007 | Gorokhov ......... H04W 72/1231 370/329 |

(Continued)

FOREIGN PATENT DOCUMENTS

| JP | 2011-229151 A | 11/2011 |
| JP | 2014-204277 A | 10/2014 |

OTHER PUBLICATIONS

International Search Report issued in PCT/JP2016/076390 dated Nov. 1, 2016 (1 page).
(Continued)

*Primary Examiner* — Philip Sobutka
(74) *Attorney, Agent, or Firm* — Osha Liang LLP

(57) ABSTRACT

To enable communication to be performed with a communication scheme suitable for the future radio communication system where a plurality of user terminals is multiplexed in the power domain, a user terminal of the present invention is provided with a reception section that receives a downlink (DL) signal to the user terminal, and a decoding section that decodes the DL signal to the user terminal, where at least one of a cyclic prefix (CP) length, symbol length and transmission time interval (TTI) length is different between the DL signal to the user terminal and a DL signal to another user terminal multiplexed in the power domain.

16 Claims, 16 Drawing Sheets

(51) Int. Cl.
*H04L 5/00* (2006.01)
*H04W 52/24* (2009.01)
*H04W 52/42* (2009.01)

(52) U.S. Cl.
CPC ....... *H04W 52/248* (2013.01); *H04W 52/346* (2013.01); *H04W 52/42* (2013.01); *H04W 72/04* (2013.01); *H04W 72/042* (2013.01); *H04W 52/244* (2013.01)

(58) Field of Classification Search
CPC ............ H04W 72/042; H04W 72/0473; H04L 5/0053; H04L 5/0073

USPC .......... 455/450, 451, 452.1, 452.2, 442, 522

See application file for complete search history.

(56) References Cited

U.S. PATENT DOCUMENTS

2015/0264662 A1* 9/2015 Sahlin ............... H04W 72/1289
 370/280
2016/0037460 A1 2/2016 Benjebbour et al.

OTHER PUBLICATIONS

Written Opinion of the International Searching Authority issued in PCT/JP2016/076390 dated Nov. 1, 2016 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in the counterpart European Patent Application No. 16848500.1, dated Mar. 29, 2019 (9 pages).

* cited by examiner

FIG. 5A
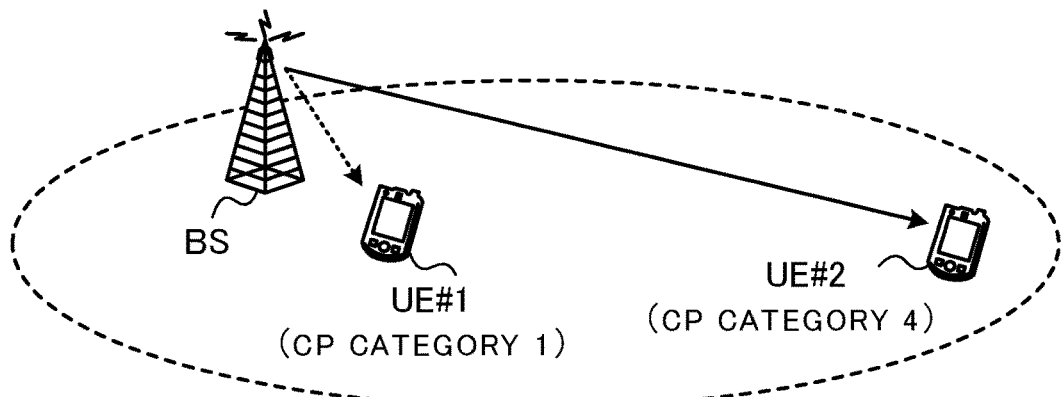
FIG. 5B
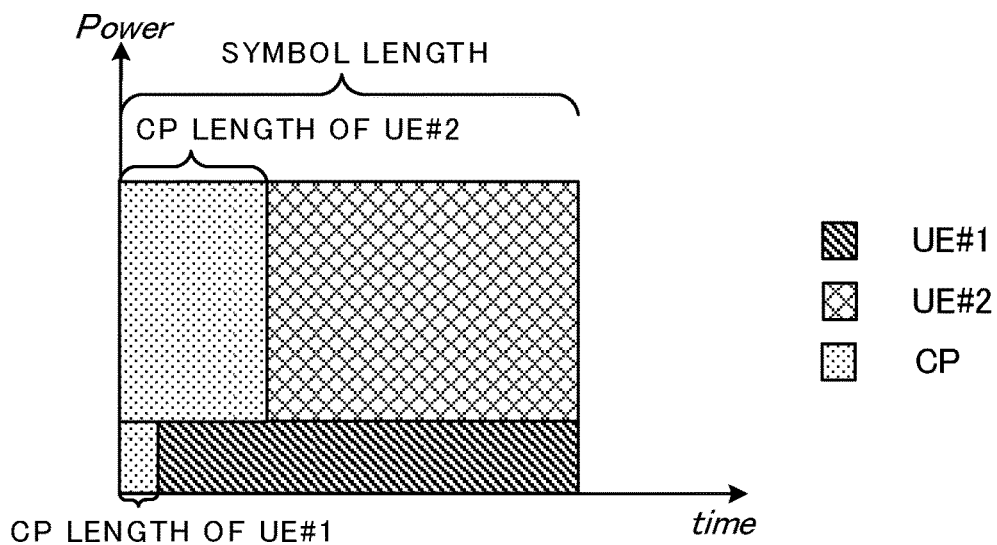
FIG. 5C
| CP CATEGORY | CP LENGTH (μ sec) |
|---|---|
| 1 | 2 |
| 2 | 4 |
| 3 | 6 |
| 4 | 8 |

FIG. 6A
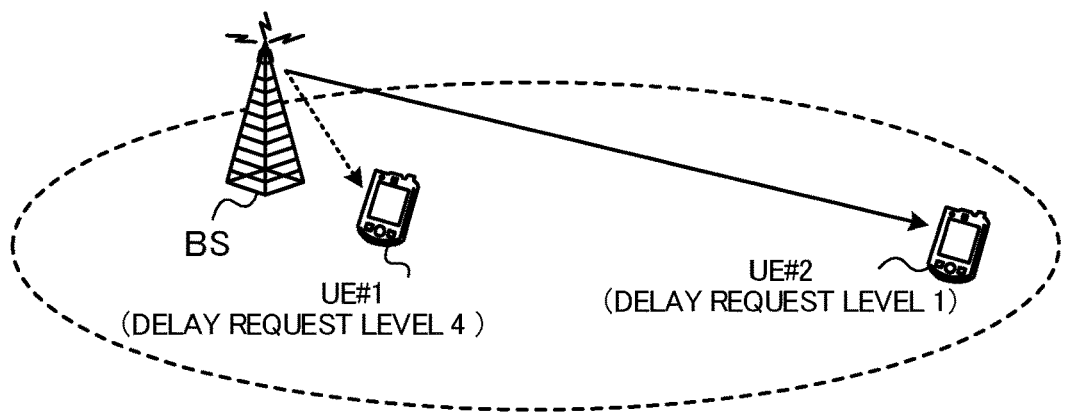
FIG. 6B
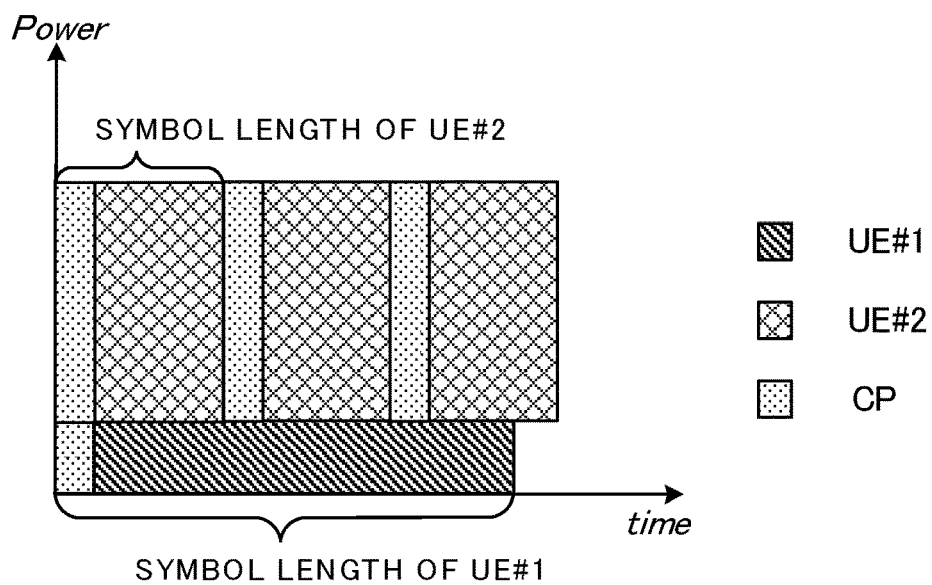
FIG. 6C
| DELAY REQUEST LEVEL | ALLOWABLE DELAY TIME (msec) |
|---|---|
| 1 | ~1 |
| 2 | 1~5 |
| 3 | 5~10 |
| 4 | 10~ |

| INFORMATION ELEMENT | THE NUMBER OF BITS | DESCRIPTION |
|---|---|---|
| Resource allocation header | 1 | HEADER ON WHETHER TO USE Resource allocation type 0 OR 1 |
| Resource block assignment | $\lceil N_{RB}^{DL}/P \rceil$ | INDICATIVE OF THE NUMBER OF ALLOCATED RBs AND ALLOCATION POSITION (P IS RBG size AND IS VARIABLE WITH SYSTEM BANDWIDTH) |
| TPC command for PUCCH | 2 | TPC bit APPLIED TO PUCCH TRANSMISSION |
| HARQ process number | 3 | HARQ process NUMBER (MAXIMUM 8 processes IN LTE) |
| Scrambling identity, rank indicater, DM-RS port | 3 | ENCODING SCID, RI, DM-RS port INDEX BY JOINT |
| Modulation and coding scheme | 10 | MODULATION SCHEME AND CODING RATE i.e. TBS |
| New data indicator | 2 | Flag INDICATIVE OF NEW OR RETRANSMISSION (NEW WHEN TOGGLED FROM THE LAST TIME) |
| Redundancy version | 4 | INDICATIVE OF TRANSMITTED REDUNDANT BIT PATTERN |

| Value of 'CP length and/or Symbol length and/or MCS Indicator' field | Description |
|---|---|
| 00 | Parameter set 1 configured by higher layers |
| 01 | Parameter set 2 configured by higher layers |
| 10 | Parameter set 3 configured by higher layers |
| 11 | Parameter set 4 configured by higher layers |

FIG. 11B

| CANDIDATE FOR CP LENGTH | BIT VALUE |
|---|---|
| 2 | 00 |
| 4 | 01 |
| 6 | 10 |
| 8 | 11 |

USER TERMINAL, RADIO BASE STATION AND RADIO COMMUNICATION METHOD USING SIGNALS MULTIPLEXED IN THE POWER DOMAIN

TECHNICAL FIELD

The present invention relates to a user terminal, radio base station and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g. also called LTE-A (LTE-Advanced), FRA (Future Radio Access), 5G (5th generation mobile communication system) and the like) to LTE have been studied.

In the future radio communication system (e.g. 5G), for use in mobile broadband, it is expected that further more increases in the speed and capacity are required, and that reduction in delay, support to connection from a large amount of devices and the like are also required.

In order to satisfy such requirements, in the future radio communication system (e.g. 5G), as a radio access scheme, it has been studied using Non-Orthogonal Multiple Access (NOMA), instead of (or in addition to) orthogonal multiple access such as Frequency Division Multiple Access (FDMA), Time Division Multiple Access (TDMA), Code Division Multiple Access (CDMA), and Orthogonal Frequency Division Multiple Access (OFDMA).

CITATION LIST

Non Patent Literature

[Non Patent Literature 1] 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

In NOMA, based on the premise of interference cancellation on the reception side, a plurality of user terminals is multiplexed (power-multiplexed) into the same radio resources (e.g. at least one of frequency, time, and code) in the power domain. By this means, it is possible to provide increases in the speed and capacity, as compared with orthogonal multiple access (e.g. OFDMA) where a single user terminal is assigned to the same radio resources.

However, when NOMA is applied only to the existing communication scheme of the LTE system, there is the risk that it is not possible to achieve furthermore increases in the speed and capacity and reduction in delay required in the future radio communication system. Accordingly, communication schemes are desirable which are suitable for the future radio communication system where a plurality of user terminals is multiplexed in the power domain.

The present invention was made in view of such a respect, and it is an object of the invention to provide a user terminal, radio base station, and radio communication method for enabling communication to be performed with a communication scheme suitable for the future radio communication system where a plurality of user terminals is multiplexed in the power domain.

Solution to Problem

In one aspect of a user terminal of the present invention, the user terminal is characterized by being provided with a reception section that receives a downlink (DL) signal to the user terminal, and a decoding section that decodes the DL signal to the user terminal, where at least one of a cyclic prefix (CP) length, symbol length and transmission time interval (TTI) length is different between the DL signal to the user terminal and a DL signal to another user terminal multiplexed in the power domain.

Advantageous Effects of the Invention

According to the present invention, it is possible to perform communication with the communication scheme suitable for the future radio communication system where a plurality of user terminals is multiplexed in the power domain.

BRIEF DESCRIPTION OF DRAWINGS

FIGS. 5A, 5B and 5C are diagrams showing one example of a radio communication method according to Aspect 1;

FIGS. 6A, 6B and 6C are diagrams showing one example of a radio communication method according to Aspect 2;

FIG. 10 is a diagram showing one example of a radio communication method according to Aspect 4;

FIGS. 11A and 11B are diagrams showing another example of the radio communication method according to Aspect 4;

DESCRIPTION OF EMBODIMENTS

Figure 1A:
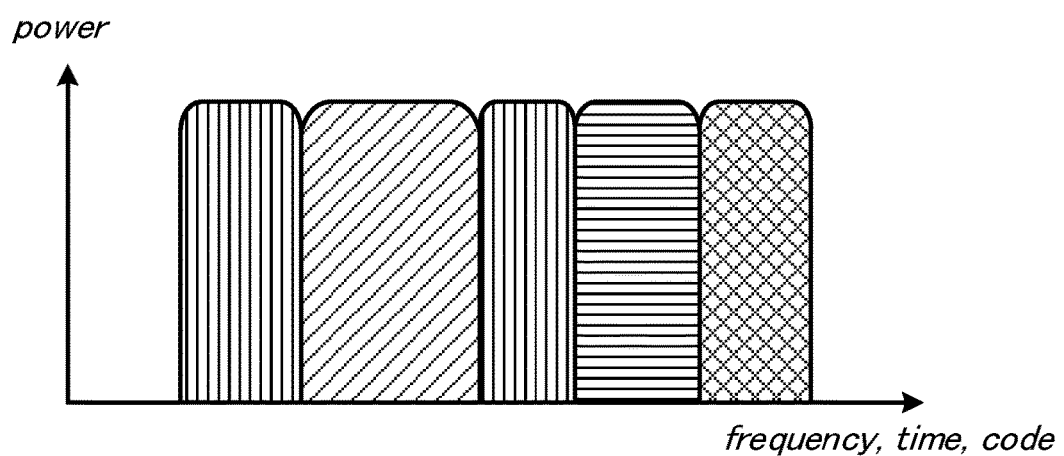
FIGS. 1A and 1B are explanatory diagrams of radio access schemes.
Figure 1B:
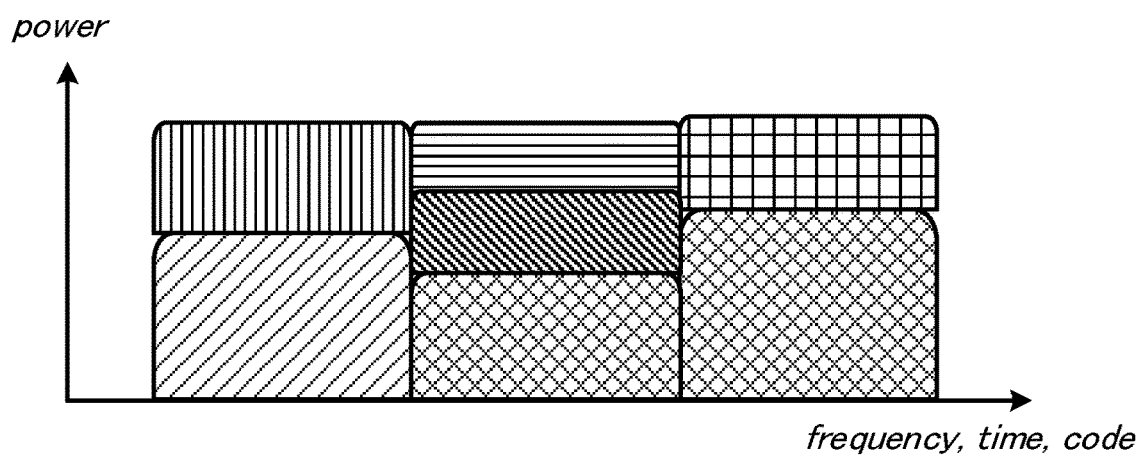

FIG. 1 contains explanatory diagrams of radio access schemes. As shown in FIG. 1A, in orthogonal multiple access such as CDMA and OFDMA, signals of a plurality of user terminals are multiplexed between orthogonal radio resources (e.g. at least one of frequency, time and code). On the other hand, as shown in FIG. 1B, in NOMA, in addition to between orthogonal radio resources, it has been studied that signals of a plurality of user terminals are multiplexed (power-multiplexed) into the same radio resources in the power domain.

Figure 2:
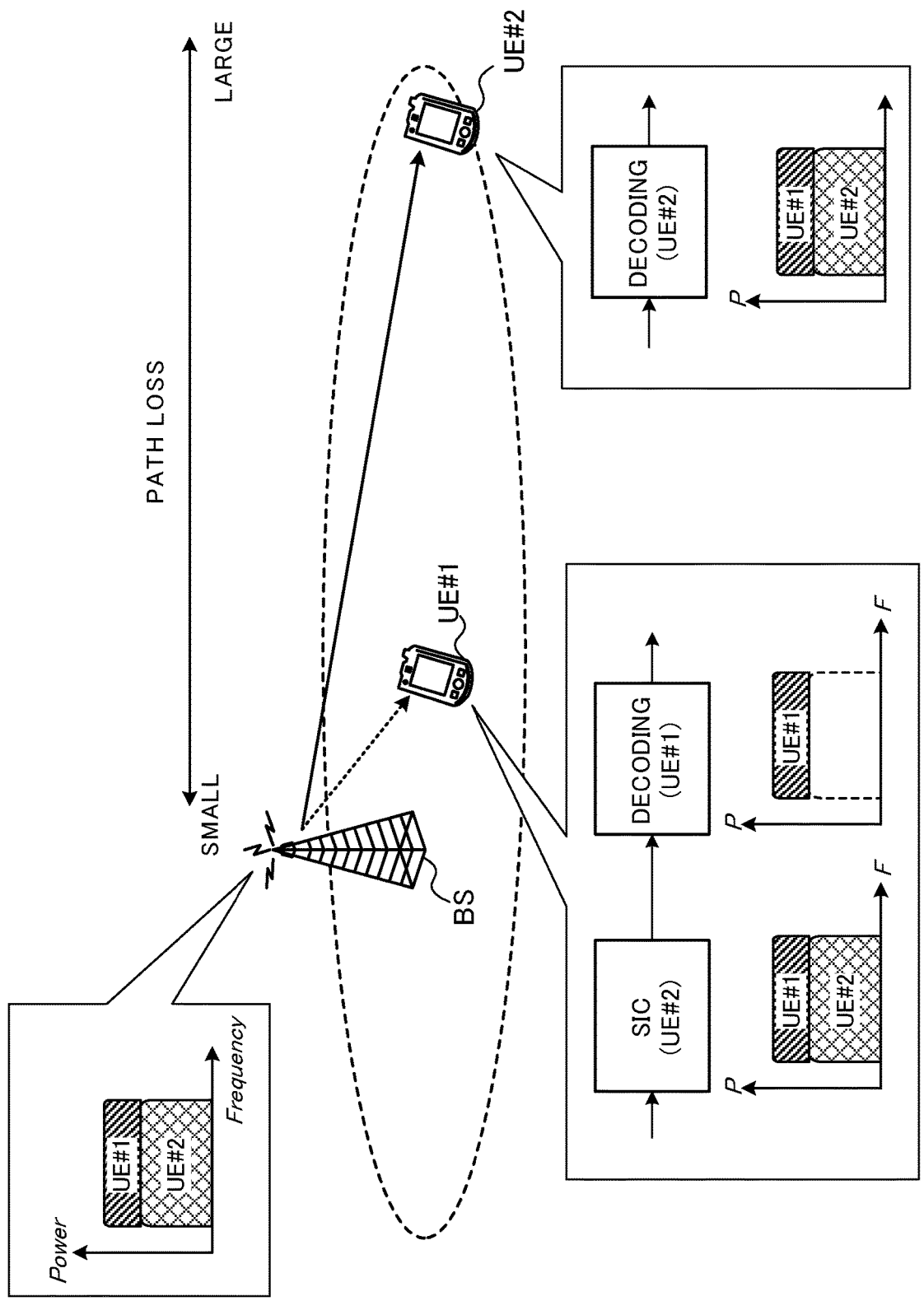
FIG. 2 is a conceptual diagram of NOMA on downlink (DL)

FIG. 2 is a conceptual diagram of NOMA on downlink (DL). FIG. 2 illustrates the case where a user terminal (UE: User Equipment) #1 (also referred to as cell-center UE, Near UE and the like) is positioned in a center portion (hereinafter, referred to as cell center portion) of a cell formed by a radio base station (also referred to as BS: Base Station, eNB: eNodeB and the like), and a user terminal #2 (also referred to as cell-edge UE, Far UE and the like) is positioned in an edge portion (hereinafter, referred to as cell edge portion) of the cell.

In NOMA, by varying transmit power corresponding to a difference in channel gain (e.g. path loss, SINR (Signal to Interference plus Noise Ratio), SNR (Signal-Noise Ratio) and the like), a plurality of user terminals is multiplexed into the same radio resources. For example, in FIG. 2, the path loss inside the cell is increased from the cell center portion toward the cell edge portion. Therefore, the radio base station on the transmission side transmits a DL signal to the user terminal #2 in the cell edge portion with large path loss (small channel gain) with higher transmit power than that of a DL signal to the user terminal #1 in the cell center portion with small path loss (large channel gain).

On the other hand, on the reception side, by removing an interference signal from a received signal with a canceller (e.g. SIC (Successive Interference Cancellation)), the DL signal to the terminal is extracted. Specifically, by removing the DL signal to another user terminal with a lower received SINR than that of the terminal, the DL signal to the terminal is extracted.

For example, in FIG. 2, the DL signal to the user terminal #2 is transmitted with higher transmit power than that of the DL signal to the user terminal #1. Therefore, the user terminal #1 receives the DL signal to the user terminal #2 as the interference signal, and properly removes the interference signal by SIC. As a result, the user terminal #1 is capable of extracting the DL signal to the terminal #1 to properly decode.

On the other hand, the DL signal to the user terminal #1 is transmitted with lower transmit power than that of the DL signal to the user terminal #2. Therefore, the user terminal #2 is capable of neglecting interference by the DL signal to the user terminal #1, and does not need to perform interference cancellation by SIC.

Thus, in the case of applying NOMA on downlink, since it is possible to power-multiplex a plurality of user terminals #1 and #2 with different channel gain into the same radio resources, it is possible to improve spectral usage efficiency. Therefore, NOMA is expected as one of radio access schemes in the future radio communication system.

Further, in the future radio communication system (e.g. 5G), instead of making a cyclic prefix (CP) length, symbol length, transmission time interval (TTI) length and the like fixed lengths as in the existing communication scheme of the LTE system, it is assumed to adopt communication schemes for enabling at least one of the CP length, symbol length and TTI length to be changed in a dynamic and/or semi-static manner.

Figure 3A:
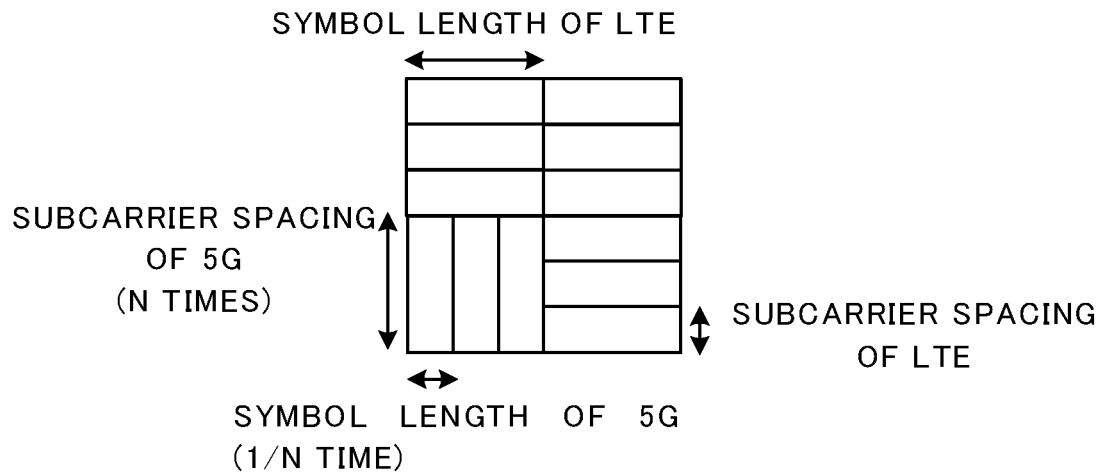
FIGS. 3A and 3B are diagrams showing one example of communication schemes in the future radio communication system.
Figure 3B:
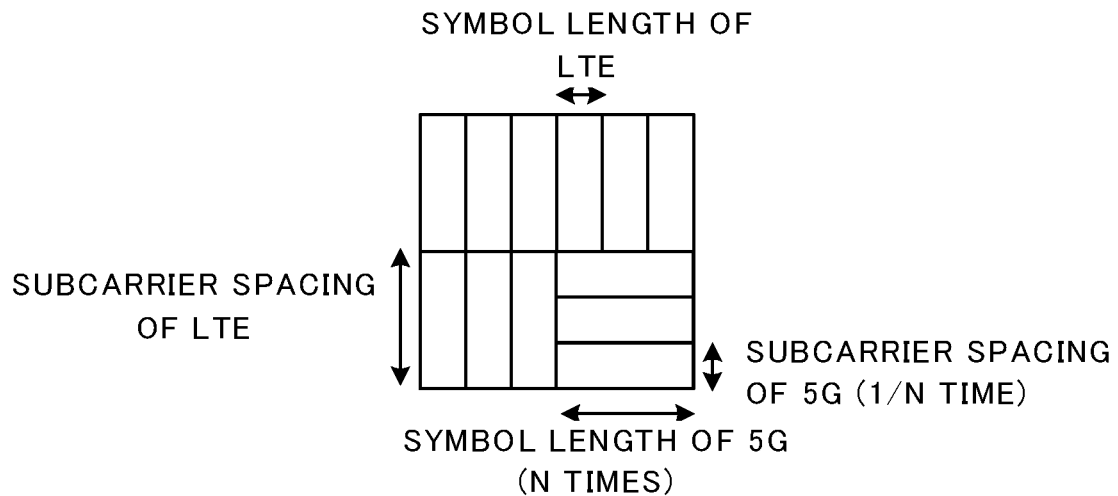

FIG. 3 contains diagrams showing one example of communication schemes in the future radio communication system. As shown in FIG. 3A, in the future radio communication system, it is assumed that a frequency parameter (e.g. subcarrier spacing, bandwidth and the like) is made N times that of the LTE system, and that a time parameter (e.g. CP length, symbol length and TTI length) is made 1/N time. In this case, it is possible to make the TTI comprised of a plurality of symbols shorter than 1 ms in the LTE system, and it is possible to facilitate achievement of low delay.

Alternatively, in the future radio communication system, it is assumed that the frequency parameter (e.g. subcarrier spacing, bandwidth and the like) is made 1/N time that of the LTE system, and that the time parameter (e.g. CP length, symbol length and TTI length) is made N times. In this case, since the CP length is long, it is possible to improve resistance to fading (robust to fading).

In addition, in the future radio communication system, it is assumed that mixed are MMB terminals of sophisticated hardware configurations with Mobile Broad Band (MBB) assumed, and low-cost terminals (also referred to as LC (Low-Cost)-MTC terminal, IoT terminal) of simplified hardware configurations with Machine-to-Machine communication (M2M), MTC (Machine Type Communication), IoT (Internet of Things) and the like assumed.

For example, in FIG. 2, the user terminal #1 in the cell center portion needs to have SIC, and therefore, is assumed to be the MBB terminal. On the other hand, the user terminal #2 in the cell edge portion does not need to perform SIC, and therefore, is assumed to be both the MBB terminal and the low-cost terminal. Thus, requirements are different between user terminals power-multiplexed into the same radio resources in NOMA.

However, in the case of simply applying NOMA to the existing communication scheme of the LTE system, it is assumed that at least one of the same CP length, symbol length, and TTI length is used in user terminals power-multiplexed into the same radio resources. In this case, there is the risk that it is not possible to achieve further more increases in the speed and capacity and reduction in delay required in the future radio communication system.

Figure 4A:
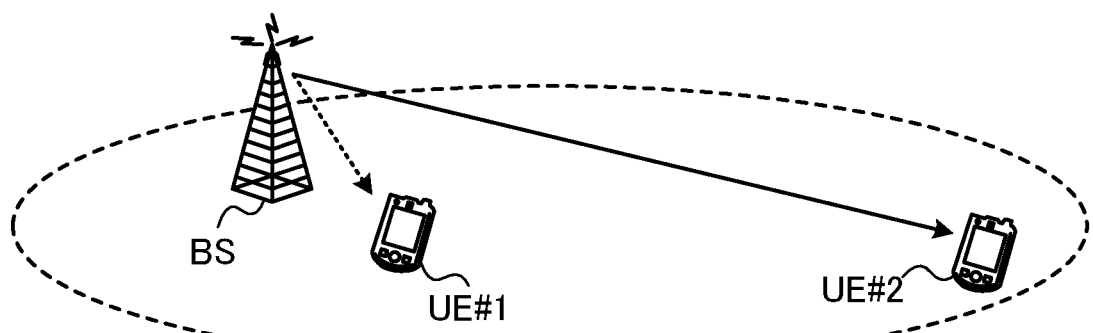
FIGS. 4A and 4B are diagrams illustrating an example of applying NOMA to the existing communication scheme of the LTE system.
Figure 4B:
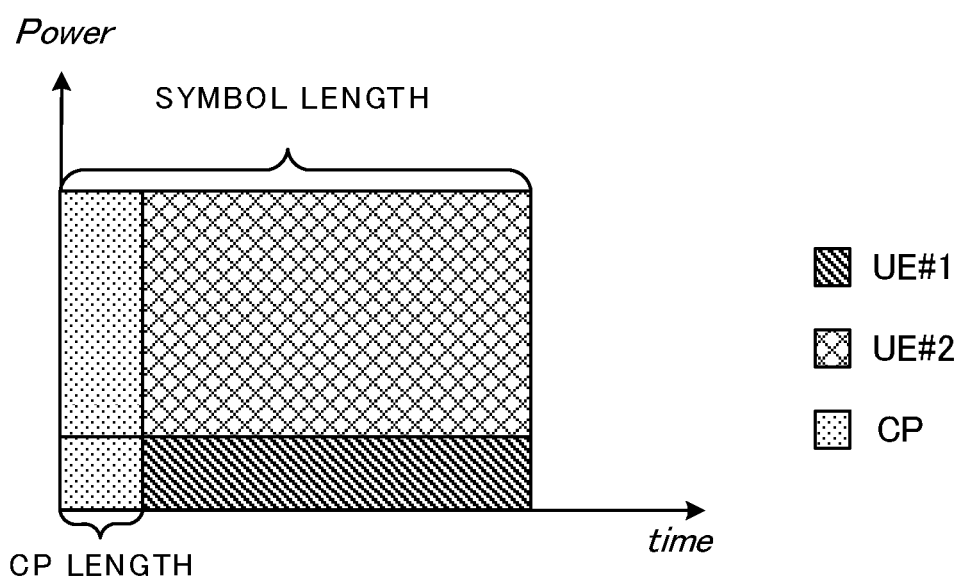

FIG. 4 contains diagrams illustrating an example of applying NOMA to the existing communication scheme of the LTE system. For example, as shown in FIG. 4A, in the case of power-multiplexing the user terminal #1 in the cell center portion and the user terminal #2 in the cell edge portion into the same radio resources, in the communication scheme of the LTE system, as shown in FIG. 4B, the same CP length and symbol length are used in the DL signal to the user terminal #1 and the DL signal to the user terminal #2.

On the other hand, it is preferable that the CP length is set to be longer, as maximum propagation delay time of the signal is longer (i.e. set to be longer, as the distance from the radio base station is farther). Therefore, as shown in FIG. 4B, when the same CP length is set on the user terminals #1 and #2, as a result that the excessively long CP length is used in the user terminal #1 in the cell center portion, there is the risk that increases in the speed and capacity are inhibited. Further, irrespective of different requirements between the user terminals #1 and #2, in the case of setting the same symbol length and/or the same TTI length, there is the risk that reduction in delay is inhibited.

Therefore, in the future radio communication system where a plurality of user terminals is multiplexed in the power domain, the inventors of the present invention conceived providing a difference in at least one of the symbol length, CP length and III length between DL signals to the plurality of user terminals, and thereby providing further more increases in the speed and capacity and reduction in delay.

Specifically, in one Embodiment of the present invention, a user terminal receives a downlink (DL) signal to the user terminal, and decodes the DL signal to the user terminal. At least one of the CP length (Aspect 1), symbol length (Aspect 2) and transmission time interval (TTI) length (Aspect 3) is different between the DL signal to the user terminal and a DL signal to another user terminal multiplexed in the power domain.

Radio communication methods according to one Embodiment of the present invention will be described below. In addition, in the following description, it is assumed that DL signals of a plurality of user terminals are power-multiplexed into radio resources orthogonalized by OFDMA, but the invention is not limited thereto. In other words, in the following description, a symbol is assumed to be an OFDMA symbol, but is not limited thereto. For example, DL signals of a plurality of user terminals may be power-multiplexed into radio resources orthogonalized by Single Carrier-Frequency Division Multiple Access (SC-FDMA), and the symbol may be a SC-FDMA symbol.

Further, in the following description, it is assumed that two user terminals are multiplexed into orthogonalized radio resources, but the invention is not limited thereto. In the following description, when a plurality of user terminals is power-multiplexed into the same radio resources, it is assumed that a user terminal that a DL signal is transmitted with relatively low transmit power is Near UE, and that a user terminal that a DL signal is transmitted with transmit power higher than in the Near UE is Far UE.

(Aspect 1)

In Aspect 1, respective different CP lengths are set between DL signals to a plurality of user terminals subjected to power multiplexing.

FIG. 5 contains diagrams illustrating an example of applying different CP lengths to a plurality of user terminals subjected to power multiplexing. FIG. 5A illustrates the example where the user terminal UE #1 in the cell center portion and the user terminal UE #2 in the cell edge portion are power-multiplexed into the same radio resources. The radio base station determines the user terminals #1 and #2 to be power-multiplexed into the same radio resources by scheduling. In addition, the scheduling may be performed after determining the CP length, or may be performed before the determination.

As shown in FIG. 5B, the radio base station determines different CP lengths between a DL signal to the user terminal UE #1 and a DL signal to the user terminal #2 to be power-multiplexed into the same radio resources. Specifically, as shown in FIG. 5C, the radio base station may select different CP categories for the user terminals #1 and #2 from among a plurality of CP categories.

Herein, the CP category is a candidate for the CP length, and different categories represent different CP lengths. For example, in FIG. 5C, CP categories 1, 2, 3 and 4 are defined which respectively represent CP lengths 2μ sec, 4μ sec, 6μ sec and 8μ sec. In addition, the CP categories are not limited to those shown in FIG. 5C.

For example, in FIG. 5A, CP category 4 is applied to the user terminal #2 in the cell edge portion, and CP category 1 is applied to the user terminal #1 in the cell center portion. In this case, as shown in FIG. 5B, the CP length of the user terminal #1 is set to be shorter than the CP length of the user terminal #2. Therefore, as compared to the case of using a sufficiently long CP length in the user terminal #1 in the cell center portion and the user terminal #2 in the cell edge portion, it is possible to decrease overhead of the CP length, and it is possible to provide increases in the speed and capacity.

In Aspect 1, the radio base station notifies the user terminal #1 of CP lengths of both the user terminals #1 and #2. Based on the CP length of the user terminal #2, the user terminal #1 decodes a DL signal of the user terminal #2, removes the DL signal of the user terminal #2 from a received signal by a canceller (e.g. SIC), and based on the CP length of the user terminal #1, decodes a DL signal of the user terminal #1.

On the other hand, the radio base station may notify the user terminal #2 of only the CP length of the user terminal #2, may notify of both the CP length of the user terminal #1 and the CP length of the user terminal #2, or may not notify of both the CP length of the user terminal #1 and the CP length of the user terminal #2.

When the radio base station notifies the user terminal #2 of only the CP length of the user terminal #2, the user terminal #2 regards the DL signal of the user terminal #1 as noise based on the CP length of the user terminal #2, and decodes the DL signal of the user terminal #2.

When the radio base station notifies the user terminal #2 of both the CP length of the user terminal #1 and the CP length of the user terminal #2, the user terminal #2 decodes the DL signal of the user terminal #1, removes the DL signal of the user terminal #1 from the received signal by a canceller (e.g. SIC), and based on the CP length of the user terminal #2, decodes the DL signal of the user terminal #2.

When the radio base station does not notify the user terminal #2 of both the CP length of the user terminal #1 and the CP length of the user terminal #2, the user terminal #2 may estimate the CP length, using a time difference in receiving a synchronization signal (including PSS: Primary Synchronization Signal and SSS: Secondary Synchronization Signal).

<Determination of the CP Length (CP Category)>

Methods of determining the CP length (CP category) in Aspect 1 will be described in detail. The radio base station determines the CP length (CP category) of each user terminal to be power-multiplexed, based on at least one of (1) timing advance (TA) of the user terminal, (2) path loss between the user terminal and the station, (3) classification information of the user terminal, and (4) power multiplexing information of the user terminal.

(1) Timing Advance (TA)

The radio base station calculates TA of the user terminal, based on reception timing of a random access preamble. Herein, the TA is transmission timing of an UL signal that is adjusted corresponding to a distance between the user terminal and the radio base station so that reception timing of an uplink (UL) signal in the radio base station coincides.

Based on the TA of a user terminal, the radio base station may determine the CP length of the user terminal. It is generally understood that as the TA of the user terminal is longer, the distance from the radio base station is farther. Therefore, the radio base station may determine a longer CP length (CP category indicative thereof) for the user terminal, as the TA of the user terminal is longer.

In addition, the radio base station may include the determined CP length in a random access response (RAR) corresponding to the random access preamble from the user terminal to transmit to the user terminal.

(2) Path Loss

Alternatively, based on path loss between a user terminal and the radio station, the radio base station may determine the CP length of the user terminal. Herein, the path loss may be reported from the user terminal to the radio base station. Alternatively, based on received power (e.g. RSRP: Reference Signal Received Power) and/or power headroom (PHR) reported from the user terminal, the radio base station may calculate the path loss between the user terminal and the station. The PHR is surplus transmit power in the user terminal, and for example, is calculated based on a difference between transmit power of an uplink control signal (e.g. PUCCH: Physical Uplink Control Channel) from the user terminal and maximum transmit power.

(3) Classification Information

Alternatively, based on classification information of a user terminal, the radio base station may determine the CP length of the user terminal. Herein, the classification information is information indicative of classification of the user terminal determined by performance (e.g. having/not having SIC), use, type (e.g. MBB terminal or low-cost terminal) and the like.

For example, in FIG. 5A, it is assumed that the low-cost terminal (e.g. IoT terminal and LC-MTC terminal) is set as the user terminal #2 (Far UE) that does not need to remove the DL signal of the other user terminal #1 by SIC. Therefore, for the low-cost terminal, the radio base station may determine a longer CP length than in the MBB terminal.

(4) Power Multiplexing Information

Alternatively, based on power multiplexing information of a user terminal, the radio base station may determine the CP length of the user terminal. Herein, when the user terminals #1 and #2 are power-multiplexed into the same radio resources as shown in FIG. 5A, the power multiplexing information is information indicating whether the user terminal is the user terminal #1 (Near UE) that a DL signal is transmitted with relatively low transmit power, or the user terminal #2 (Far UE) that a DL signal is transmitted with transmit power higher than in the user terminal #1.

Since the distance from the radio base station is assumed to be shorter in the user terminal #1 (Near UE) than in the user terminal #2, the radio base station may determine a shorter CP length than in the user terminal #2 for the user terminal #1. In addition, whether the user terminal is Far UE or Near UE may be determined based on a result of comparing at least one of path loss, received power, received quality and PHR of the user terminal with a predetermined threshold.

As described above, based on at least one of TA, path loss, classification information, and power multiplexing information, the radio base station determines the CP length (or CP category) of each of a plurality of user terminals power-multiplexed into the same radio resources. Generally, since it is desirable to set the CP length to be larger as the distance from the radio base station is farther, as shown in FIG. 5B, it is assumed that the radio base station sets the CP length of the user terminal #2 (Far UE) to be longer than the CP length of the user terminal #1 (Near UE), but the invention is not limited thereto.

Further, as shown in FIG. 5B, it may be defined that the CP length (or CP category) of the user terminal #1 (Near UE) is always the CP length of the user terminal #2 (Far UE) or less. By this means, it is possible to reduce an amount of signaling from the radio base station to the user terminals #1 and #2 subjected to power multiplexing.

For example, as shown in FIG. 5C, in the case of defining four kinds of CP categories, when different CP lengths are used in the user terminals #1 and #2, total 4 bits are required including 2 bits for the user terminal #1 and 2 bits for the user terminal #2. On the other hand, in the case where it is defined that the CP length of the user terminal #1 (Near) is always the CP length of the user terminal #2 (Far UE) or less, when the user terminal #2 is of CP category 2, since the CP category of the user terminal #1 is CP category 1 or 2, and is thus two kinds, the number of bits required for notification of the CP length is "3" in total including 1 bit for the user terminal #1 and 2 bits for the user terminal #2. Further, when the user terminal #2 is of category 1, since the user terminal #1 is always of category 1, it is not necessary to notify of the CP length of the user terminal #1. Therefore, the number of bits required for notification of the CP length is only "2" for the user terminal #2.

In this way, when it is defined that the CP length (or CP category) of the user terminal #1 (Near UE) is always the CP length of the user terminal #2 (Far UE) or less, since candidates for the CP length of the user terminal #1 (Near UE) are limited, it is possible to reduce a signaling amount between the user terminal and the radio base station.

Further, when it is defined that the CP length (or CP category) of the user terminal #1 (Near UE) is always the CP length of the user terminal #2 (Far UE) or less, it is possible to reduce operation in the user terminal and/or the radio base station. For example, in the case where the user terminal #1 (Near UE) is notified of only the CP length of the user terminal #1, for example, when the user terminal #1 needs to estimate the CP length of the user terminal #2 (Far UE) with PSS and SSS, since candidates for the CP length of the user terminal #2 are limited, it is possible to reduce operation of estimating the CP length in the user terminal #1. Similarly, in the case where the user terminal #2 is notified of only the CP length of the user terminal #1, for example, when the user terminal #2 needs to estimate the CP length of the user terminal #1 with PSS and SSS, since candidates for the CP length of the user terminal #1 are limited, it is possible to reduce operation of estimating the CP length in the user terminal #2.

In addition, the radio base station is also applicable to the case of using the above-mentioned method of determining the CP length in radio access schemes (e.g. OFDMA) other than NOMA. In this case, the radio base station may notify each user terminal of the CP length determined for each user terminal.

According to Aspect 1, since respective different CP lengths are set between DL signals to a plurality of user terminals subjected to power multiplexing, it is possible to perform communication using a sufficient CP length necessary for the DL signal to each user terminal. As a result, as compared with the case of using a sufficiently large common CP length in DL signals to a plurality of user terminals subjected to power multiplexing, since overhead of the CP length is decreased, it is possible to provide increases in the speed and capacity.

(Aspect 2)

In Aspect 2, different symbol lengths are set on a plurality of user terminals subjected to power multiplexing. In the following description, it is assumed that the same CP length is used in a plurality of user terminals subjected to power multiplexing, and different CP lengths may be used. In other words, Aspect 2 is capable of being combined with Aspect 1.

FIG. 6 contains diagrams illustrating one example of applying different symbol lengths to a plurality of user terminals subjected to power multiplexing. FIG. 6A illustrates the example where the user terminal #1 in the cell center portion and the user terminal #2 in the cell edge portion are power-multiplexed into the same radio resources. The radio base station determines the user terminals #1 and #2 to be power-multiplexed into the same radio resources by scheduling. In addition, the scheduling may be performed after determining the symbol length, or may be performed before the determination.

As shown in FIG. 6B, the radio base station determines different CP lengths between the user terminals #1 and #2 to be power-multiplexed into the same radio resources. In addition, since the symbol length and the subcarrier spacing are in the relationship of the reciprocal (see FIG. 3), determination of the symbol length is synonymous with determination of the subcarrier spacing.

Specifically, as shown in FIG. 6C, the radio base station may determine symbol lengths applied to the user terminals #1 and #2, corresponding to a delay request level reported from the user terminal. For example, in FIG. 6C, delay request levels 1, 2, 3 and 4 are defined which respectively represent allowable delay time less than 1 ms, from 1 ms to less than 5 ms, from 5 ms to less than 10 ms, and 10 ms or more. In addition, the kinds and number of delay request levels are not limited those shown in FIG. 6C.

For example, in FIG. 6A, the delay request level 1 is applied to the user terminal #2 in the cell edge portion, and the delay request level 4 is applied to the user terminal #1 in the cell center portion. In this case, as shown in FIG. 6B, the symbol length of the user terminal #2 with short allowable delay time is set to be shorter than the symbol length of the user terminal #1 with long allowable delay time.

Further, as shown in FIG. 6B, the symbol length of the user terminal #1 may not be n times (n is a positive integer) the symbol length of the user terminal #2, or may be n times. As shown in FIG. 6B, when the symbol length of the user terminal #1 may not be n times the symbol length of the user terminal #2, in order to decode the DL signal to the user terminal #1, the user terminal #1 needs to receive n times (in FIG. 6B, n=3) the symbol length of the user terminal #2 exceeding the symbol length of the user terminal #1. As a result, decoding delay of the user terminal #1 increases.

Therefore, as distinct from FIG. 6B, it is desirable that the symbol length of the user terminal #1 is n times the symbol length of the user terminal #2. Alternatively, not shown in the figure, the symbol length of the user terminal #2 may be n times the symbol length of the user terminal #1.

Figure 7A:
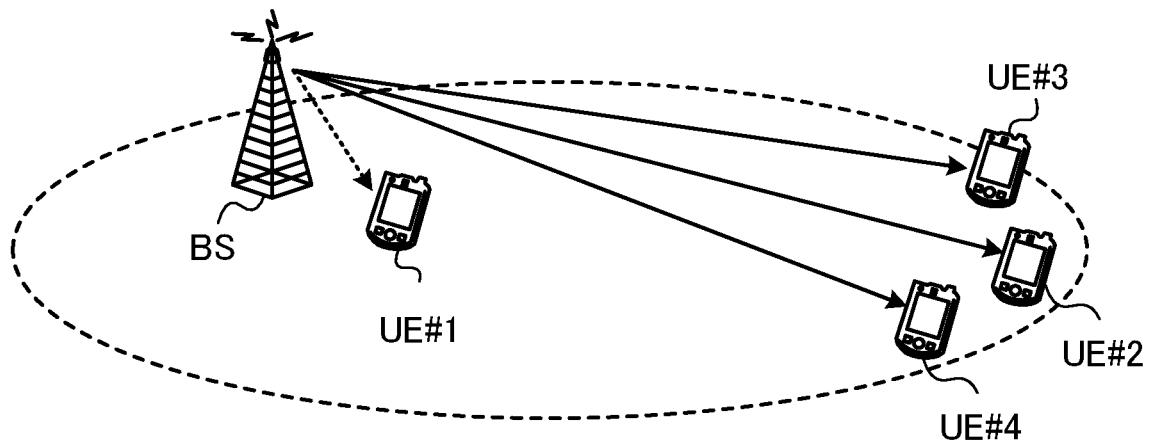
FIGS. 7A and 7B are diagrams showing another example of the radio communication method according to Aspect 2.

FIG. 7 contains diagrams showing another example of applying different symbol lengths to user terminals subjected to power multiplexing. FIG. 7A illustrates the example of performing power multiplexing on the user terminal #1 (Near UE) in the cell center portion, and user terminals #2, #3 and #4 (Far UE) in the cell edge portion.

Figure 7B:
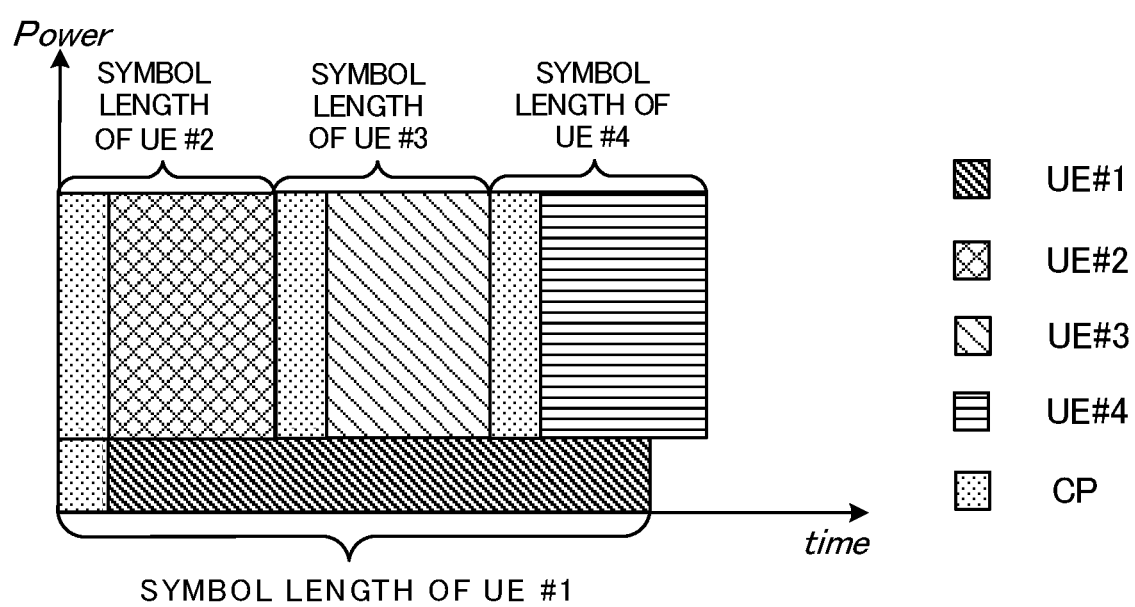

As shown in FIG. 7B, in the case of making symbol lengths of the user terminals #2, #3 and #4 (Far UE) shorter than the symbol length of the user terminal #1 (Near UE), the radio base station may assign DL signals to different Far UEs for each symbol. For example, in FIG. 7B, the user terminal #1 and the user terminals #2, #3 and #4 are multiplexed in the power domain, and the user terminal #2, user terminal #3 and user terminal #4 are multiplexed in the time domain. The radio base station notifies each of the user terminals #1 to #4 of the symbol length determined corresponding to the delay request level.

In FIGS. 6 and 7, the radio base station notifies the user terminal #1 (Near UE) of symbol lengths of both the user terminal #1 and the Far UE (in FIG. 6, the user terminal #2, and in FIG. 7, user terminals #2 to #4). Based on the CP length of the Far UE, the user terminal #1 sequentially decodes a DL signal (in FIGS. 6 and 7, three-symbol length) of the Far UE, removes the DL signal of the Far UE from the received signal by a canceller (e.g. SIC) after receiving all of one-symbol length to the user terminal #1, and based on the symbol length of the user terminal #1, decodes a DL signal of the user terminal #1.

On the other hand, the radio base station may notify the Far UE of only the CP length of the Far UE, may notify of both the CP length of the user terminal #1 (Near UE) and the CP length of the Far UE, or may not notify of both the CP lengths. Decoding processing of the DL signal in the Far UE is the same as in Aspect 1, and therefore, the description is omitted.

<Determination of the Symbol Length>

Method of determining the symbol length according to Aspect 2 will be described in detail. The radio base station determines the symbol length of the user terminal, based on at least one of (1) delay request level reported from the user terminal, (2) classification information of the user terminal, and (3) billing plan of the user terminal.

(1) Delay Request Level

As described above, based on the delay request level of a user terminal, the radio base station may determine the symbol length of the user terminal. Further, corresponding to a report request from the radio base station, the user terminal may report the delay request level to the radio base station, with an uplink control signal (e.g. PUCCH) or higher layer signaling (e.g. RRC (Radio Resource Control) signaling). Alternatively, the user terminal may periodically report the delay request level to the radio base station with the uplink control signal or higher layer signaling. Alternatively, the user terminal may report the delay request level to the radio base station with a random access signal (e.g. PRACH: Physical Random Access Channel) in initial access to the radio base station.

(2) Classification Information

Alternatively, based on the classification information of a user terminal, the radio base station may determine the symbol length of the user terminal. Herein, as described above, the classification information is information indicative of classification of the user terminal determined by performance (e.g. having/not having SIC), use, type (e.g. MBB terminal or low-cost terminal) and the like.

(3) Billing Plan

Alternatively, based on the billing plan of a user terminal, the radio base station may determine the symbol length of the user terminal. For example, the radio base station may set a user terminal with a higher billing plan for a shorter symbol length. By this means, it is possible to provide the user terminal of a higher billing plan with lower delay. In this case, the radio base station may acquire information indicative of the billing plan of the user terminal from a data server that stores the billing plan of the user terminal, and corresponding to a category of the billing plan, may determine the symbol length.

In addition, the radio base station is also applicable to the case of using the above-mentioned method of determining the symbol length in radio access schemes (e.g. OFDMA) other than NOMA. In this case, the radio base station may notify each user terminal of the symbol length determined for each user terminal.

According to Aspect 2, since different symbol lengths are set on a plurality of user terminals subjected to power multiplexing, it is possible to decode a DL signal to a user terminal with a short symbol length in a short time, and to provide reduction in delay.

(Aspect 3)

In Aspect 3, different TTI lengths are set on a plurality of user terminals power-multiplexed into the same radio resources. In the following description, it is assumed that the same CP length is used in a plurality of user terminals subjected to power multiplexing, and different CP lengths may be used. In other words, Aspect 3 is capable of being combined with Aspect 1. Further, Aspect 3 is capable of being combined also with Aspect 2, or is capable of being used without being combined.

Figure 8A:
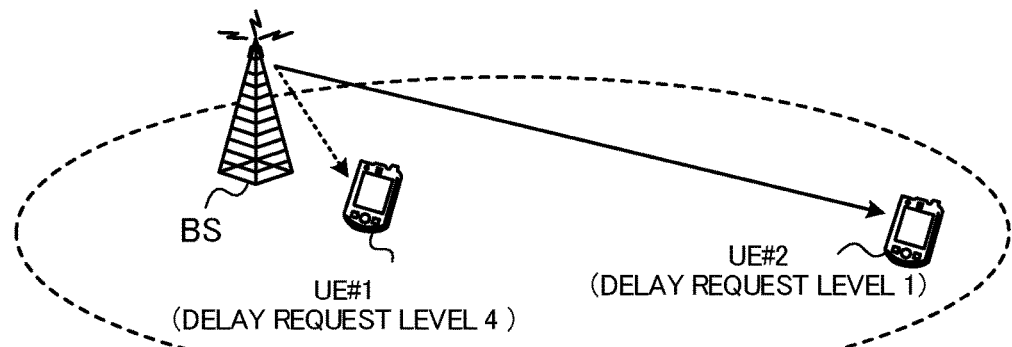
FIGS. 8A and 8B are diagrams showing one example of a radio communication method according to Aspect 3.

FIG. 8 contains diagrams illustrating one example of applying different TTI lengths to a plurality of user terminals subjected to power multiplexing. FIG. 8A illustrates the example where the user terminal #1 (Near UE) in the cell center portion and the user terminal #2 (Far UE) in the cell edge portion are power-multiplexed into the same radio resources. The radio base station determines the user terminals #1 and #2 to be power-multiplexed into the same radio resources by scheduling. In addition, the scheduling may be performed after determining the symbol length, or may be performed before the determination.

Figure 8B:
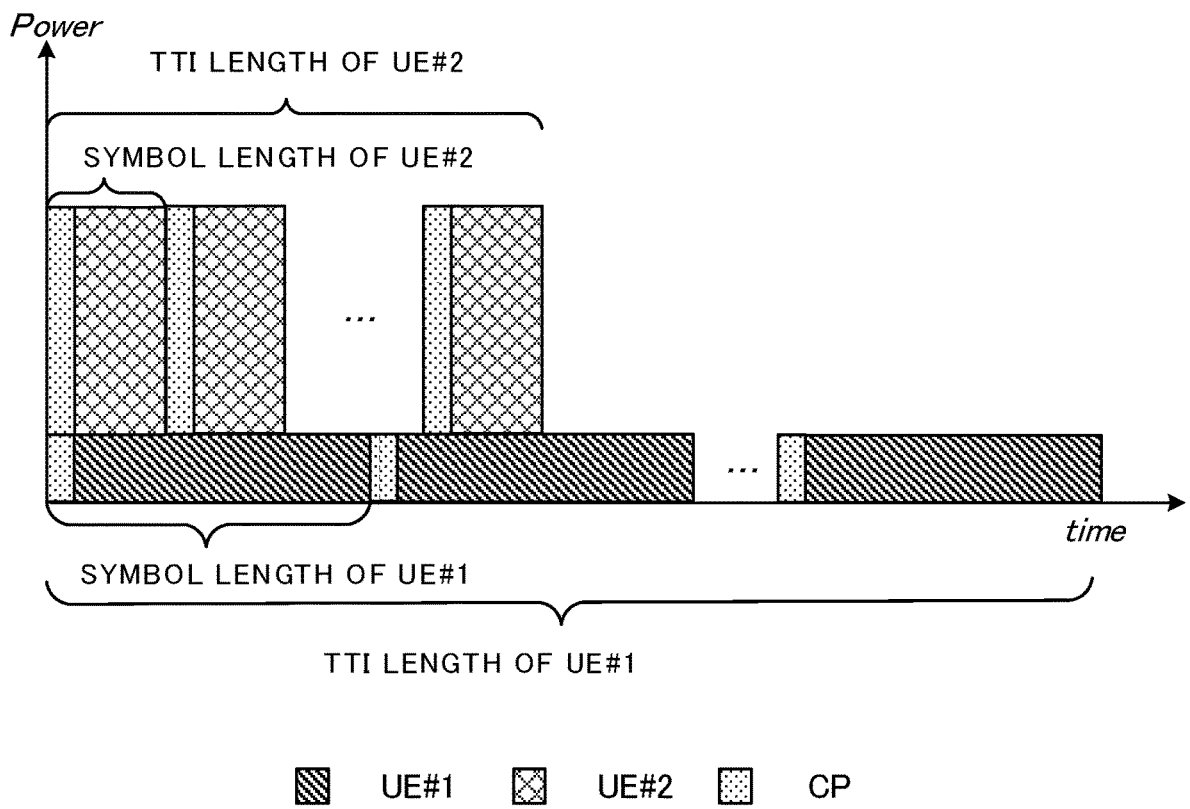

As shown in FIG. 8B, the radio base station determines different symbol lengths and TTI lengths between the user terminals #1 and #2 to be power-multiplexed into the same radio resources. Specifically, corresponding to the delay request level reported from the user terminal, the radio base station may determine the symbol lengths applied to the user terminals #1 and #2.

For example, in FIG. 8A, the delay request level 1 is applied to the user terminal #2 in the cell edge portion, and the delay request level 4 is applied to the user terminal #1 in the cell center portion. In this case, as shown in FIG. 8B, the symbol length and TTI length of the user terminal #2 with short allowable delay time are set to be shorter than the symbol length and TTI length of the user terminal #1 with long allowable delay time.

Figure 9A:
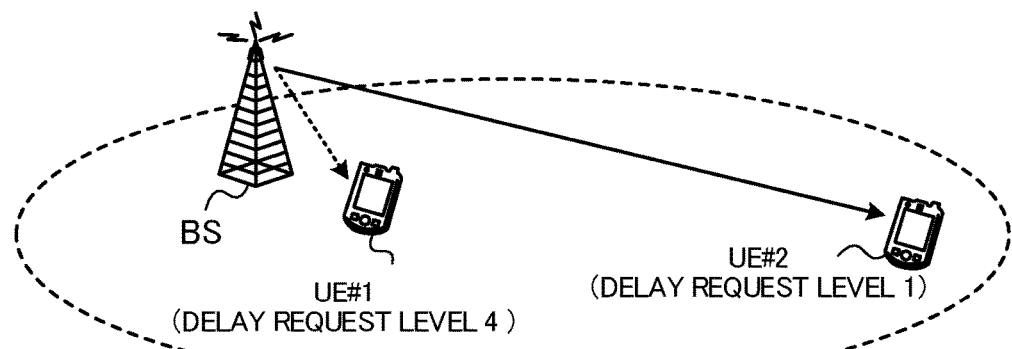
FIGS. 9A and 9B are diagrams showing another example of the radio communication method according to Aspect 3.
Figure 9B:
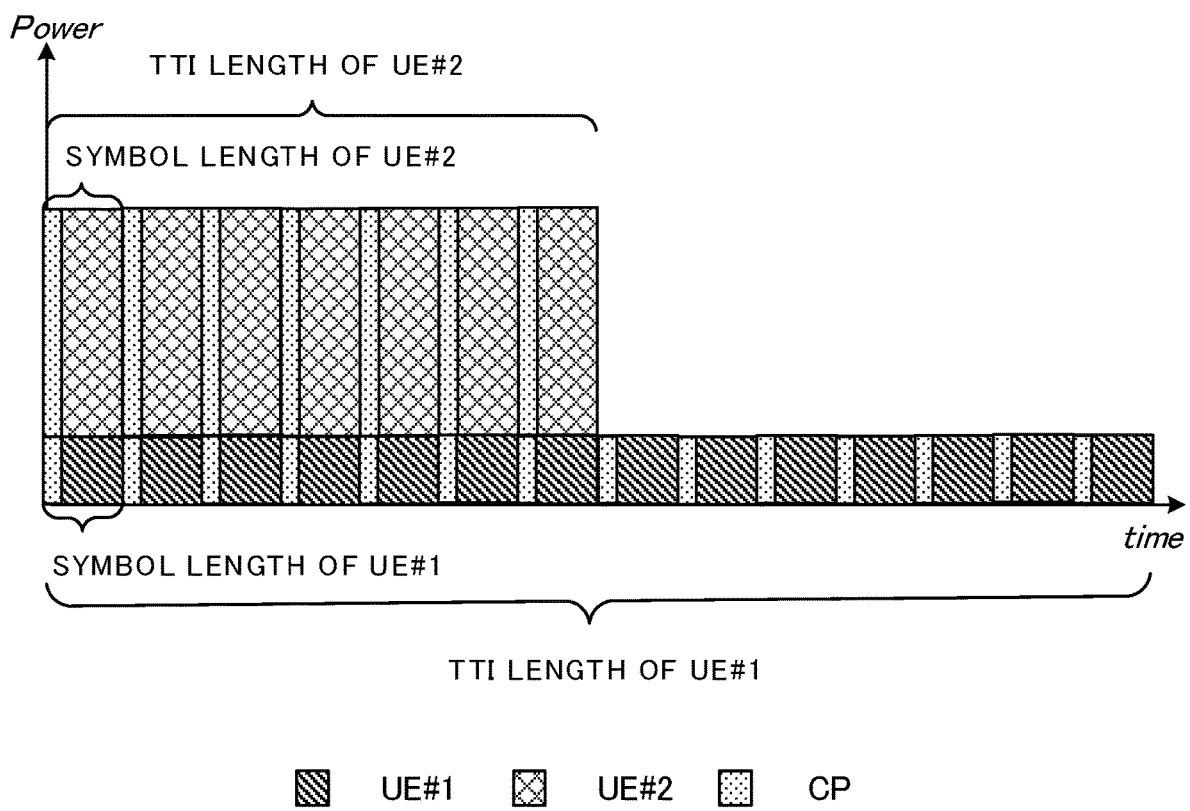

FIG. 9 contains diagrams illustrating another example of applying different TTI lengths to a plurality of user terminals subjected to power multiplexing. As shown in FIG. 9B, the radio base station may determine the different numbers of symbols between the user terminals #1 and #2 subjected to power multiplexing. As shown in FIG. 9B, when the same CP length and symbol length are used in the user terminals #1 and #2, the radio base station may determine different TTI lengths, by varying the number of symbols in the user terminals #1 and #2. For example, as shown in FIG. 9B, by making the number of symbols of the user terminal #2 lower than the number of symbols of the user terminal #1, the TTI length of the user terminal #2 is set to be shorter than the TTI length of the user terminal #1.

In addition, in FIGS. 8B and 9B, different user terminals may be time-multiplexed for each symbol (see FIG. 7). Further, the number of symbols within the TTI may be different for user terminal and/or for each radio base station, or may be fixed.

When the number of symbols within the TTI is fixed, the radio base station needs to notify the user terminal of only the TTI length. The user terminal is capable of estimating the symbol length, from the TTI length notified from the radio base station and the beforehand determined number (e.g. 14) of symbols. On the other hand, when the number of symbols within the TTI is variable, the radio base station notifies the user terminal of the TTI length and the number of symbols.

Further, in FIGS. 8 and 9, the radio base station notifies the user terminal #1 of TTI lengths of the user terminals #1 and #2. On the other hand, the radio base station may notify the user terminal #2 of only the TTI length of the user terminal #2, may notify of both the TTI length of the user terminal #1 and the TTI length of the user terminal #2, or may not notify of both the TTI lengths. Decoding processing of the DL signal in the user terminals #1 and #2 is the same as in Aspects 1 and 2, and therefore, the description is omitted.

<Determination of the TTI Length>

Methods of determining the TTI length according to Aspect 3 will be described in detail. In FIGS. 8 and 9, the radio base station determines the TTI length, corresponding to the delay request level of the user terminal. Specifically, for the user terminal #2 with a high delay request level (short allowable delay time), the radio base station determines the TTI length shorter than in the user terminal #1 with a low delay request level (long allowable delay time), but the invention is not limited thereto.

In Aspect 3, the radio base station may determine the TTI length (or the number of symbols) of the user terminal, based on at least one of (1) delay request level reported from the user terminal, (2) classification information of the user terminal, and (3) billing plan of the user terminal. In addition, details of the delay request level, classification information and billing plan are the same as in Aspect 2, and therefore, the description is omitted.

In addition, the radio base station is also applicable to the case of using the above-mentioned method of determining the TTI length in radio access schemes (e.g. OFDMA) other than NOMA. In this case, the radio base station may notify each user terminal of the TTI length determined for each user terminal.

According to Aspect 3, since different TTI lengths are set on a plurality of user terminals to be power-multiplexed into the same radio resources, it is possible to decode a DL signal to a user terminal with a short TTI length in a short time, and to provide reduction in delay.

(Aspect 4)

Aspect 4 describes aspects of notifying the user terminal of at least one of the CP length, symbol length, and TTI length determined in Aspect 1 to 3 in detail. Specifically, the radio base station notifies the user terminal of communication scheme information indicative of at least one of the CP length (or CP category), symbol length and TTI length, using a physical layer control signal, higher layer control signal, or both the physical layer control signal and the higher layer control signal.

<Physical Layer Control Signal>

The radio base station may transmit a physical layer control signal including the communication scheme information indicative of at least one of the CP length (or CP category), symbol length and TTI length applied to a DL signal to the Near UE (user terminal #1 in FIGS. 5 to 9) and/or a DL signal (s) to the Far UE (user terminal #2 in FIGS. 5 to 9, user terminals #3 and 4 in FIG. 7).

Herein, the physical layer control signal is a signal of the physical layer of the PDCCH (Physical Downlink Control Channel), EPDCCH (Enhanced Physical Downlink Control Channel) or the like. Using the physical layer control signal, downlink control information (DCI) of various formats is transmitted. The above-mentioned communication scheme information may be added as a new information element of the DCI, or an existing information element may be reused. For example, as the above-mentioned communication scheme information, bits for the modulation and coding scheme (MCS) may be reused.

FIG. 10 is a diagram showing one example of DCI format 2C. The DCI format 2C is a format for transmission mode (TM) 9 that supports dynamical switching between single-user MIMO (Multiple Input and Multiple Output) and multi-user MIMO.

In the case of Rank (layer) 1, the number of bits required for MCS bits is "5". In the case of Rank 1, by using the DCI format 2C with 10 MCS bits, remaining 5 bits (e.g. latter 5 bits among 10 bits) which are not used in notification of the MCS are used in notification of the above-mentioned communication scheme information.

On the other hand, in the case of Rank 2 or more, the number of bits required for MCS bits is "10" defined in normal DCI format 2C. Therefore, by reducing types of MCSs capable of being notified, 5 bits are used in notification of the MCS, and remaining 5 bits (e.g. latter 5 bits among 10 bits) are used in notification of the above-mentioned communication scheme information.

In the case of transmitting the communication scheme information from the radio base station to the user terminal with the physical layer control signal, it is possible to dynamically change the CP length, symbol length and TTI length.

<Higher Layer Control Signal>

Alternatively, the radio base station may transmit a higher layer control signal including the communication scheme information indicative of at least one of the CP length (or CP category), symbol length and TTI length applied to a DL signal to the Near UE (user terminal #1 in FIGS. 5 to 9) and/or a DL signal (s) to the Far UE (user terminal #2 in FIGS. 5 to 9, user terminals #3 and 4 in FIG. 7).

Herein, the higher layer control signal is a control signal such as RRC signaling and broadcast signal higher (e.g. layers 2 and 3) than the physical layer. The higher layer control signal may include a random access response. Further, the higher layer control signal may include Network-Assisted Interference Cancellation and Suppression (NAICS) signaling.

In the case of transmitting the communication scheme information from the radio base station to the user terminal with the higher layer control signal, it is possible to semi-statically change the CP length, symbol length and TTI length.

<Both the Physical Layer Control Signal and the Higher Layer Control Signal>

Alternatively, the radio base station may transmit the higher layer control signal indicative of each candidate set configured by including at least one of the CP length (or CP category), symbol length and TTI length, and further transmits the physical layer control signal indicative of a candidate set applied to a DL signal to the Near UE (user terminal #1 in FIGS. 5 to 9) and/or a DL signal(s) to the Far UE (user terminal #2 in FIGS. 5 to 9, user terminals #3 and 4 in FIG. 7).

FIG. 11 contains explanatory diagrams of candidate sets and physical layer control signals indicative of the candidate sets. FIG. 11 describes the example of beforehand transmitting the higher layer control signal including four candidate sets (parameter sets), but the number of candidate sets is not limited thereto.

Each candidate set includes at least one of the CP length, symbol length, TTI length and MCS applied to a DL signal to the Near UE and/or a DL signal to the Far UE. For example, in FIG. 11B, the CP length included in each of four candidate sets is associated with a bit value included in the physical layer control signal. In addition, each candidate set may be included in a parameter set used in Quasi co-location in LTE Rel. 11, or may be defined separately from Quasi co-location.

The radio base station selects a candidate set applied to a DL signal to the Near UE and/or a DL signal to the Far UE from among a plurality of beforehand notified candidate sets, and transmits the physical layer control signal indicative of the selected candidate set. As shown in FIG. 11A, since each candidate set is associated with the bit value, the radio base station transmits the physical layer control signal including the bit value indicative of the selected candidate set.

In the case of designating a candidate set selected from among a plurality of candidate sets notified with the higher layer control signal, using the physical layer control signal, it is possible to simplify signaling between the radio base station and the user terminal, while dynamically changing the CP length, symbol length and TTI length.

In addition, the radio base station may not transmit the physical layer control signal including the bit value indicative of the selected candidate set. In this case, the user terminal estimates a candidate set applied to a DL signal to the Near UE and/or a DL signal to the Far UE from among a plurality of be forehand notified candidate sets.

(Radio Communication System)

A configuration of a radio communication system according to one Embodiment of the present invention will be described below. In the radio communication system, the above-mentioned radio communication methods are applied. In addition, the radio communication methods according to each of the above-mentioned Aspects may be applied alone, or may be applied in combination thereof.

Figure 12:
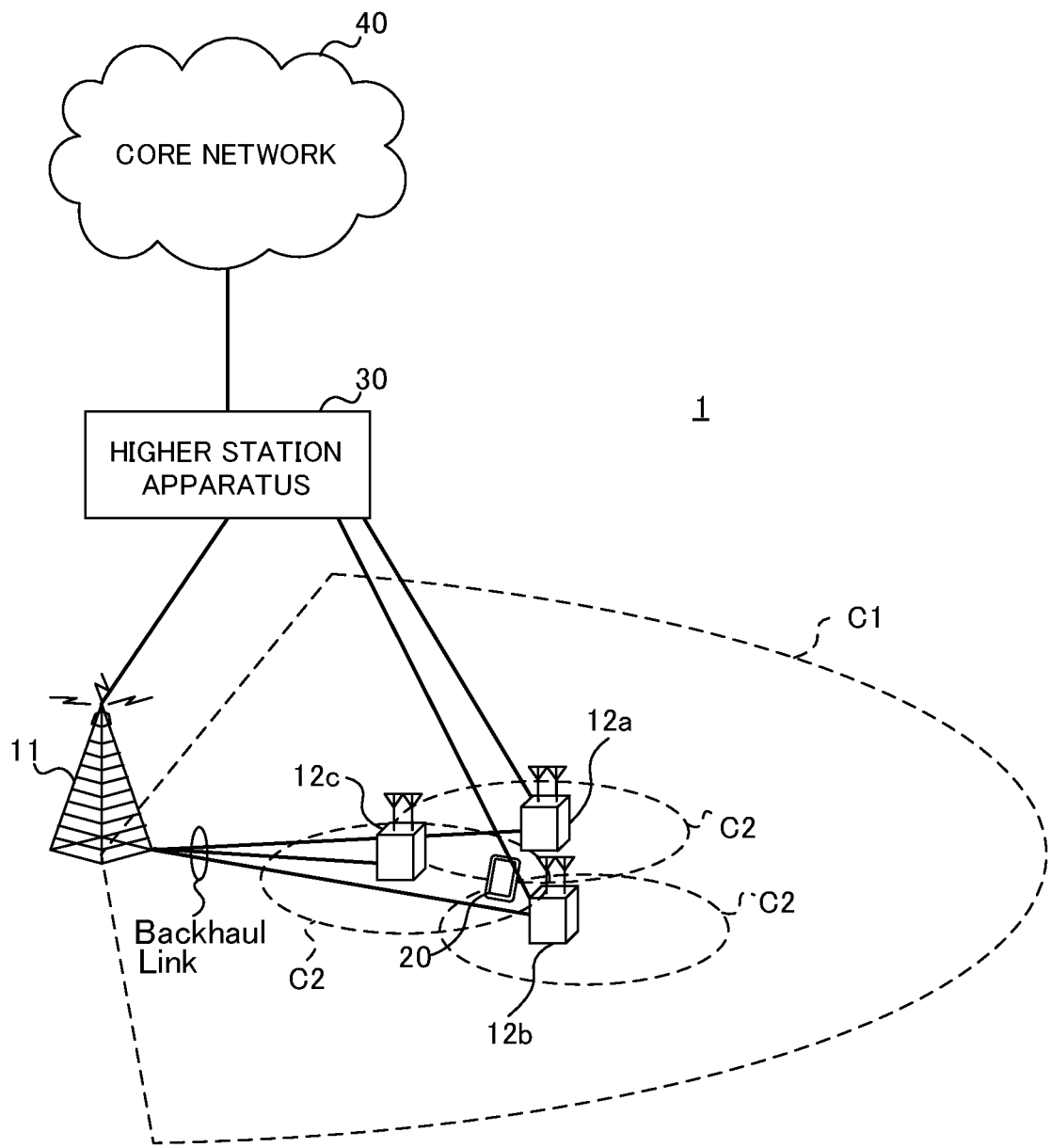
FIG. 12 is a diagram showing one example of a schematic configuration of a radio communication system according to this Embodiment.

FIG. 12 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g. 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access) and the like.

The radio communication system 1 as shown in FIG. 12 is provided with a radio base station 11 for forming a macro cell C1, and radio base stations 12a to 12c disposed inside the macro cell C1 to form small cells C2 smaller than the macro cell C1. Further, a user terminal 20 is disposed in the macro cell C1 and each of the small cells C2.

The user terminal 20 is capable of connecting to both the radio base station 11 and the radio base station 12. The user terminal 20 is assumed to concurrently use the macro cell C1 and small cell C2 using different frequencies by CA or DC. Further, the user terminal 20 is capable of applying CA or DC using a plurality of cells (CCs) (e.g. six or more CCs).

The user terminal 20 and radio base station 11 are capable of communicating with each other using carriers (called the existing carrier, Legacy carrier and the like) with a narrow bandwidth in a relatively low frequency band (e.g. 2 GHz). On the other hand, the user terminal 20 and radio base station 12 may use carriers with a wide bandwidth in a relatively high frequency band (e.g. 3.5 GHz, 5 GHz and the like), or may use the same carrier as in the radio base station 11. In addition, the configuration of the frequency band used in each radio base station is not limited thereto.

It is possible to configure so that the radio base station 11 and radio base station 12 (or two radio base stations 12) undergo wired connection (e.g. optical fiber in conformity with CPRI (Common Public Radio Interface), X2 interface and the like), or wireless connection.

The radio base station 11 and each of the radio base stations 12 are relatively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal.

In the radio communication system 1, as radio access schemes, NOMA (Non-Orthogonal Multiple Access) (also called power multiple access) is applied on downlink, and OFDMA (Orthogonal Frequency DivisionMultiple Access) may be applied. OFDMA is a multicarrier transmission scheme for dividing a frequency band into a plurality of narrow frequency bands (subcarriers), and mapping data to each subcarrier to perform communication. Further, SC-FDMA (Single Carrier-Frequency Division Multiple Access) is applied on uplink, and NOMA and OFDMA may be applied. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes.

As downlink channels, in the radio communication system 1 are used a downlink data channel (PDSCH: Physical Downlink Shared Channel) shared by user terminals 20, broadcast channel (PBCH: Physical Broadcast Channel), L1/L2 control channels (L1/L2 control signals) and the like. User data, higher layer control information, SIB (System Information Block) and the like are transmitted on the PDSCH. Further, MIB (Master Information Block) is transmitted on the PBCH.

The L1/L2 control channel includes the downlink control channel (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH is transmitted on the PDCCH. The number of OFDM symbols used in the PDCCH is transmitted on the PCFICH. Receipt confirmation information (ACK/NACK) of HARQ for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink data channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the uplink data channel.

Uplink control information (UCI) including at least one of receipt confirmation information (ACK/NACK), radio quality information (CQI) and the like are transmitted on the uplink data channel or uplink control channel. A random access preamble to establish connection with the cell is transmitted on the random access channel.

<Radio Base Station>

Figure 13:
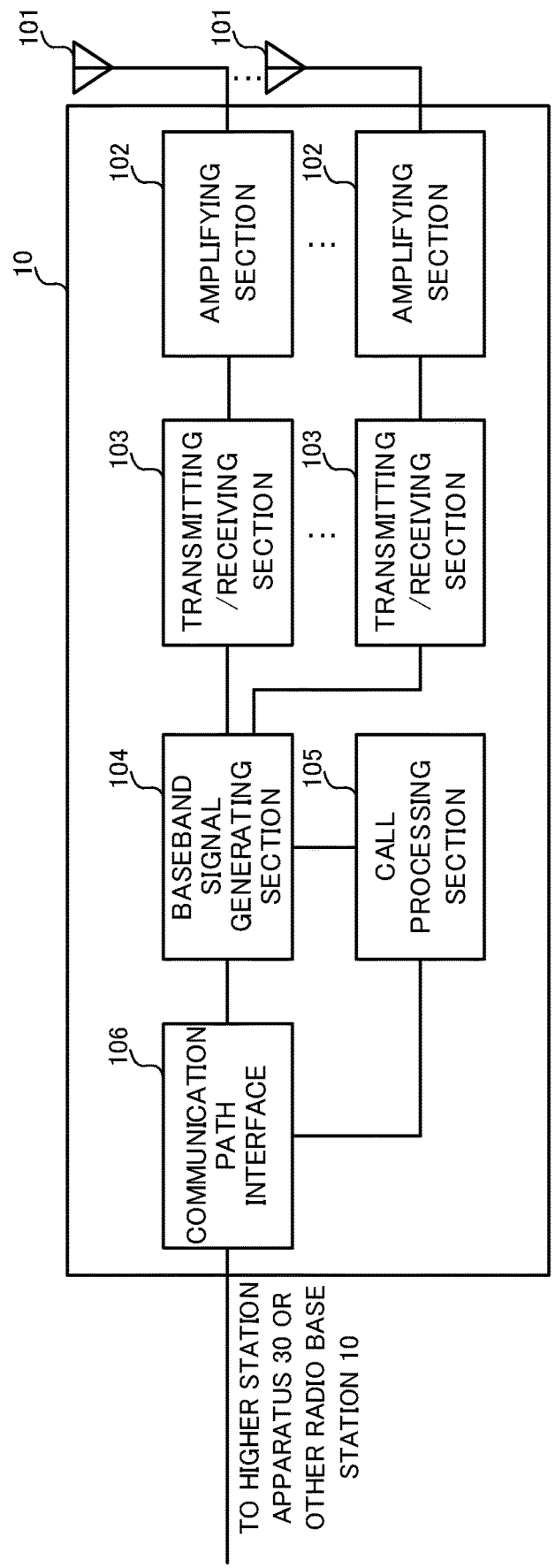
FIG. 13 is a diagram showing one example of an entire configuration of a radio base station according to this Embodiment.

FIG. 13 is a diagram showing one example of an entire configuration of the radio base station according to one Embodiment of the present invention. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station may be configured to include at least one or more.

User data to transmit to the user terminal 20 from the radio base station 10 on downlink is input to the baseband signal processing section 104 from the higher station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g. transmission processing of HARQ (Hybrid Automatic Repeat reQuest)), scheduling, transmission format selection, channel coding, Inverse Fast Fourier Transform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101.

Further, the transmission/reception section 103 may transmit the physical layer control signal or higher layer control signal including the communication scheme information indicative of at least one of the CP length (or CP category), symbol length and TTI length applied to a downlink (DL) signal to the user terminal 20 and/or a DL signal to another user terminal 20 multiplexed with the user terminal 20 in the power domain.

Furthermore, the transmission/reception section 103 may transmit the higher layer control signal indicative of each candidate set configured by including at least one of the CP length (or CP category), symbol length and TTI length, and transmit the physical layer control signal indicative of a candidate set applied to a DL signal to the user terminal 20 and/or a DL signal to another user terminal 20 multiplexed with the user terminal 20 in the power domain.

The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for uplink (UL) signals, radio-frequency signals received in the transmission/reception antennas 101 are amplified in the amplifying sections 102. The transmission/reception section 103 receives the UL signal amplified in the amplifying section 102. The transmission/reception section 103 performs frequency conversion on the received signal into a baseband signal to output to the baseband signal processing section 104.

For user data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the transmission path interface 106. The call processing section 105 performs call processing such as setting and release of a communication channel, state management of the radio base station 10, and management of radio resources.

The transmission path interface 106 transmits and receives signals to/from the higher station apparatus 30 via a predetermined interface. Further, the transmission path interface 106 may transmit and receive signals (backhaul signaling) to/from an adjacent radio base station 10 via an inter-base station interface (e.g. optical fiber in conformity with CPRI (Common Public Radio Interface), X2 interface).

Figure 14:
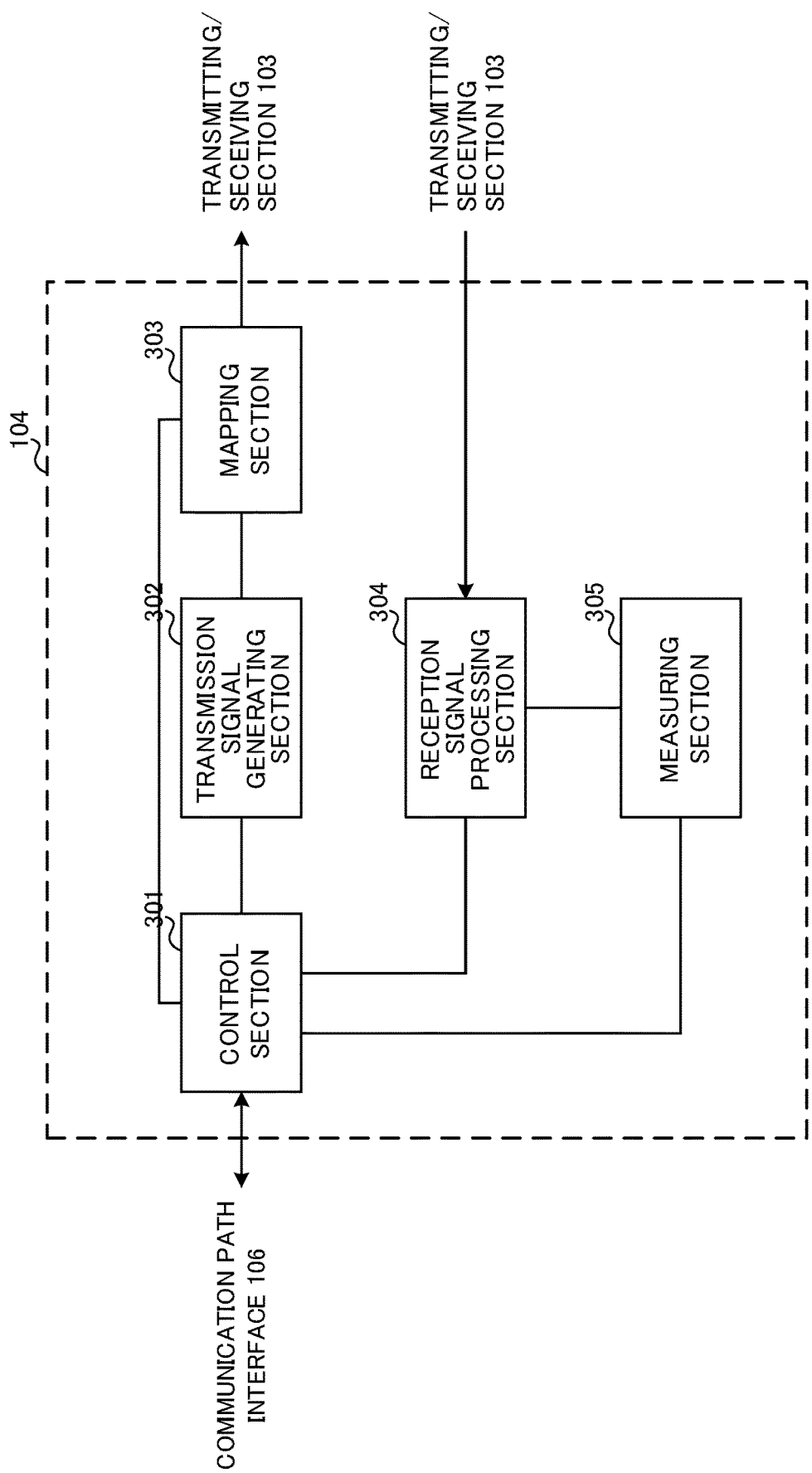
FIG. 14 is a diagram showing one example of a function configuration of the radio base station according to this Embodiment.

FIG. 14 is a diagram showing one example of a function configuration of the radio base station according to this Embodiment. In addition, FIG. 14 mainly illustrates function blocks of a characteristic portion in this Embodiment, and the radio base station 10 is assumed to have other function blocks required for radio communication. As shown in FIG. 14, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls generation of downlink signals by the transmission signal generating section 302, mapping of signals by the mapping section 303, and reception processing of signals by the received signal processing section 304.

Further, the control section 301 controls allocation (scheduling) of radio resources to DL signals (including the downlink data channel, downlink control channel (physical layer control signal) and downlink reference signal). Furthermore, the control section 301 determines a plurality of user terminals multiplexed into the same radio resources in the power domain, and controls transmit power allocated to each user terminal.

Moreover, the control section 301 controls so that at least one of the cyclic prefix (CP) length, symbol length and transmission time interval (TTI) length is different between the DL signal to the user terminal 20 and the DL signal to another user terminal 20 multiplexed in the power domain.

Specifically, the control section 301 may determine the CP length (or CP category) of the user terminal 20, based on at least one of (1) timing advance (TA) of the user terminal 20, (2) path loss between the user terminal 20 and the station, (3) classification information of the user terminal 20, and (4) power multiplexing information of the user terminal 20 (Aspect 1).

For example, the control section 301 may make the CP length applied to the DL signal to Near UE (user terminal 20 to which low transmit power is allocated among a plurality of user terminals 20 to be power-multiplexed) shorter than the CP length applied to the DL signal to Far UE (user terminal 20 to which high transmit power is allocated among a plurality of user terminals 20 to be power-multiplexed).

Further, the control section 301 may determine the symbol length of the user terminal 20, based on at least one of (1) delay request level reported from the user terminal 20, (2) classification information of the user terminal 20, and (3) billing plan of the user terminal 20 (Aspect 2).

For example, the control section 301 may make the symbol length applied to the DL signal to the Near UE longer than the symbol length applied to the DL signal to the Far UE. Further, the control section 301 may make the symbol length applied to the DL signal to the Near UE n times (n is a positive integer) the symbol length applied to the DL signal to the Far UE. Furthermore, the control section 301 may perform time multiplexing on a plurality of Far UEs.

Moreover, the control section 301 may determine the TTI length (and/or the number of symbols) of the user terminal 20, based on at least one of (1) delay request level reported from the user terminal 20, (2) classification information of the user terminal 20, and (3) billing plan of the user terminal 20 (Aspect 3).

The control section 301 is capable of being comprised of a controller, control circuit or control apparatus explained based on the common recognition in the technical field according to the present invention.

Based on instructions from the control section 301, the transmission signal generating section 302 generates DL signals (including the downlink data channel, downlink control channel (L1 control signal) and downlink reference signal) to output to the mapping section 303.

The transmission signal generating section 302 is capable of being comprised of a signal generator, signal generating circuit or signal generating apparatus explained based on the common recognition in the technical field according to the present invention.

Based on instructions from the control section 301, the mapping section 303 maps the downlink signal generated in the transmission signal generating section 302 to predetermined radio resources to output to the transmission/reception section 103. The mapping section 303 is capable of being comprised of a mapper, mapping circuit or mapping apparatus explained based on the common recognition in the technical field according to the present invention.

The received signal processing section 304 performs reception processing (e.g. demapping, demodulation, decoding and the like) on the uplink (UL) signal (including the uplink data channel, uplink control channel and uplink reference signal) transmitted from the user terminal 20. The processing result is output to the control section 301.

The received signal processing section 304 is capable of being comprised of a signal processor, signal processing circuit or signal processing apparatus and a measurement device, measurement circuit or measurement apparatus explained based on the common recognition in the technical field according to the present invention.

The measurement section 305 performs measurement using the uplink reference signal from the user terminal 20, and outputs the measurement result to the control section 301. Specifically, the measurement section 305 measures (estimates) a channel state of each layer, using the uplink reference signal orthogonal or quasi-orthogonal between layers.

The measurement section 305 is capable of being comprised of a signal processor, signal processing circuit or signal processing apparatus and a measurement device, measurement circuit or measurement apparatus explained based on the common recognition in the technical field according to the present invention.

(User Terminal)

Figure 15:
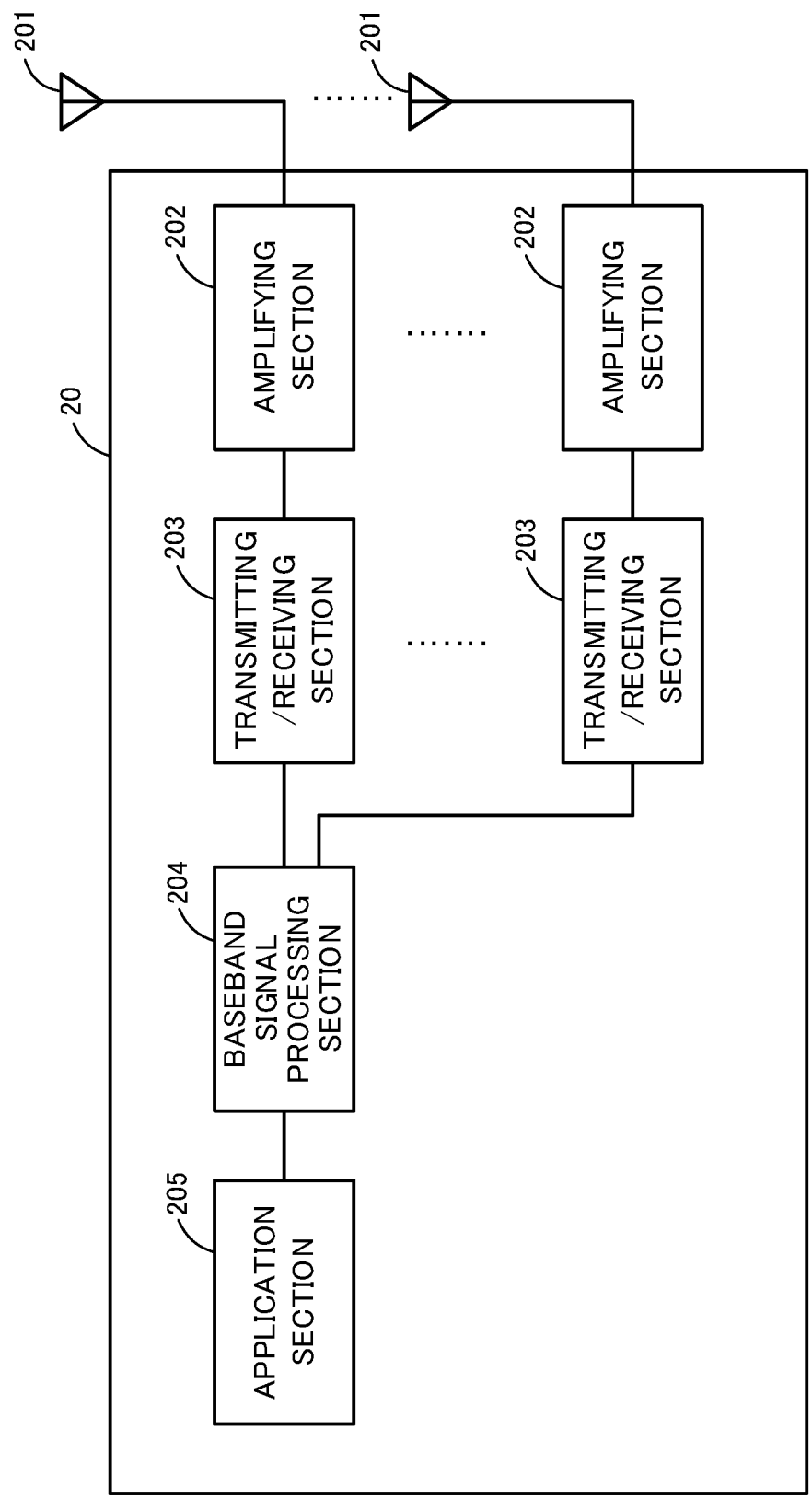
FIG. 15 is a diagram showing one example of an entire configuration of a user terminal according to this Embodiment.

FIG. 15 is a diagram showing one example of an entire configuration of the user terminal according to one Embodiment of the present invention. The user terminal 20 is provided with a plurality of transmission/reception antennas 201 for MIMO transmission, amplifying sections 202, transmission/reception sections 203, baseband signal processing section 204, and application section 205.

Radio-frequency signals received in a plurality of transmission/reception antennas 201 are respectively amplified in the amplifying sections 202. Each of the transmission/reception sections 203 receives the downlink signal amplified in the amplifying section 202. The transmission/reception section 203 performs frequency conversion on the received signal into a baseband signal to output to the baseband signal processing section 204.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g. transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and transmitted from the transmission/reception antennas 201, respectively.

In addition, the transmission/reception section 203 may receive the physical layer control signal or higher layer control signal including the communication scheme information indicative of at least one of the CP length, symbol length and TTI length applied to the DL signal to the user terminal 20 and/or the DL signal to another user terminal 20 multiplexed with the user terminal 20 in the power domain.

Further, the transmission/reception section 203 may receive the higher layer control signal indicative of each candidate set configured by including at least one of the CP length, symbol length and TTI length, and receive the physical layer control signal indicative of a candidate set applied to the DL signal to the user terminal 20 and/or the DL signal to another user terminal 20 multiplexed with the user terminal 20 in the power domain.

The transmission/reception section 203 is capable of being comprised of a transmitter/receiver, transmission/reception circuit or transmission/reception apparatus explained based on the common recognition in the technical field according to the present invention. Further, the transmission/reception section 203 may be comprised as an integrated transmission/reception section, or may be comprised of a transmission section and reception section.

Figure 16:
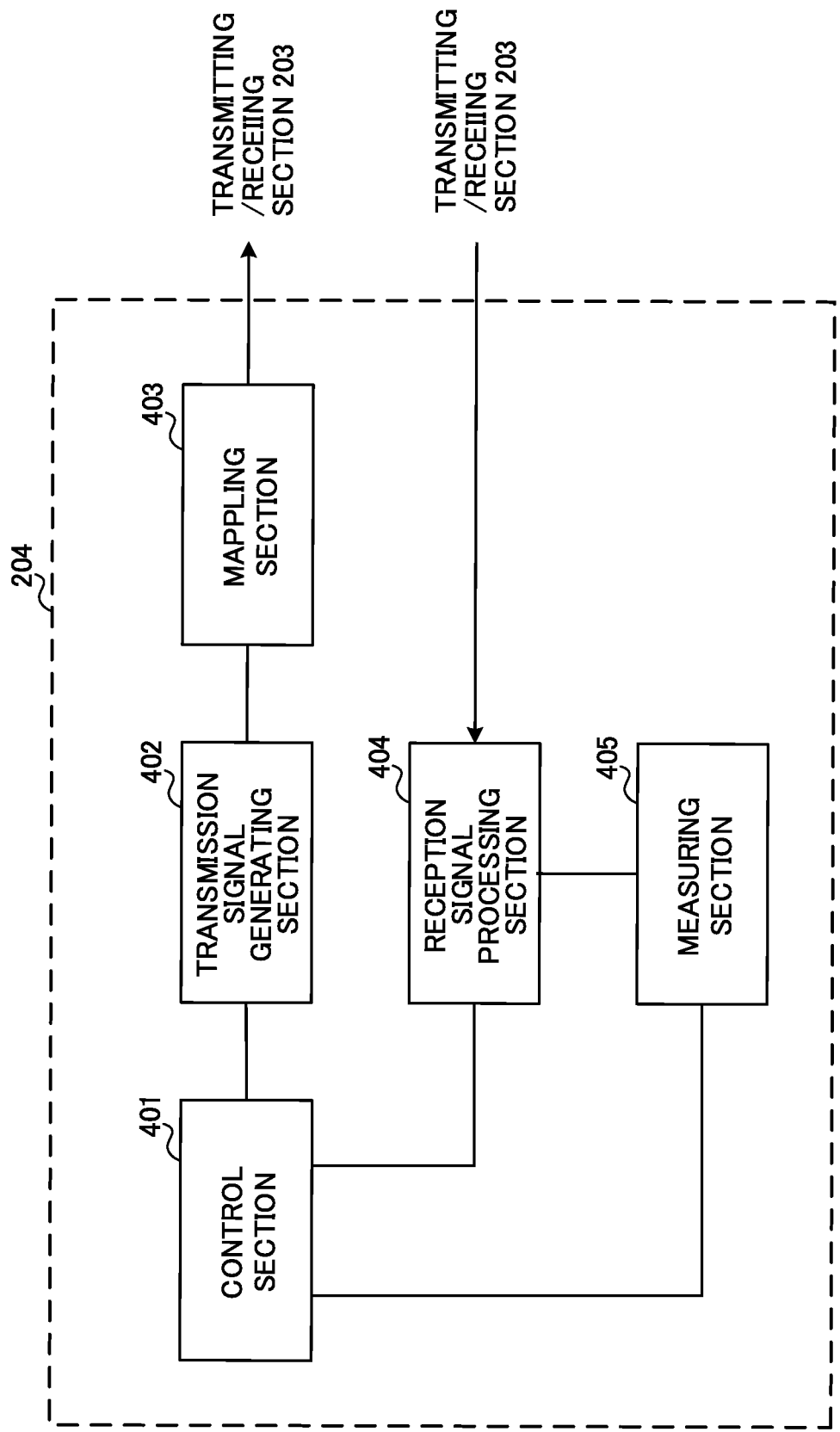
FIG. 16 is a diagram showing one example of a function configuration of the user terminal according to this Embodiment.

FIG. 16 is a diagram showing one example of a function configuration of the user terminal according to this Embodiment. In addition, FIG. 16 mainly illustrates function blocks of a characteristic portion in this Embodiment, and the user terminal 20 is assumed to have other function blocks required for radio communication. As shown in FIG. 16, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls generation of signals by the transmission signal generating section 402, mapping of signals by the mapping section 403, and reception processing of signals by the received signal processing section 404.

Further, the control section 401 controls the received signal processing section 404 so as to perform reception processing of the DL signal to the user terminal 20, based on the CP length, symbol length and TTI length indicated by the communication scheme information received in the transmission/reception section 203.

Specifically, in the case of being Near UE ((user terminal 20 to which low transmit power is allocated among a plurality of user terminals 20 to be power-multiplexed), the control section 401 controls the received signal processing section 404 so as to decode the DL signal to the Near UE, based on a decoding result of the DL signal to Far UE (user terminal 20 to which high transmit power is allocated among a plurality of user terminals 20 to be power-multiplexed), and at least one of the CP length, symbol length and TTI length applied to the DL signal to the Near UE.

On the other hand, in the case of being the Far UE, the control section 401 may control the received signal processing section 404 so as to decode the DL signal to the Far UE, based on at least one of the CP length, symbol length and TTI length applied to the DL signal to the Far UE.

Alternatively, in the case of being the Far UE, the control section 401 may control the received signal processing section 404 so as to decode the DL signal to the Far UE, based on a decoding result of the DL signal to the Near UE, and at least one of the CP length, symbol length and TTI length applied to the DL signal to the Far UE.

Further, in the case of being the Far UE, the control section 401 may control the received signal processing section 404 so as to decode the DL signal to the Far UE, based on a CP length estimated based on a reception time difference between PSS and SSS.

The control section 401 is capable of being comprised of a controller, control circuit or control apparatus explained based on the common recognition in the technical field according to the present invention.

Based on instructions from the control section 401, the transmission signal generating section 402 generates UL signals (including the uplink data channel, uplink control channel, and uplink reference signal) to output to the mapping section 403. For example, the transmission signal generating section 402 generates the uplink control channel including the UCI. Further, the transmission signal generating section 402 generates the uplink data channel including the uplink user data.

Specifically, based on instructions from the control section 401, the transmission signal generating section 402 generates the uplink reference signal orthogonal or quasi-orthogonal between layers.

Specifically, the transmission signal generating section 402 may generate the uplink reference signal of each layer using sequences orthogonal or quasi-orthogonal between layers.

The transmission signal generating section 402 is capable of being comprised of a signal generator, signal generating circuit or signal generating apparatus explained based on the common recognition in the technical field according to the present invention.

Based on instructions from the control section 401, the mapping section 403 maps the UL signal (uplink control signal, uplink data channel, uplink reference signal and the like) generated in the transmission signal generating section 402 to radio resources to output to the transmission/reception section 203. The mapping section 403 is capable of being comprised of a mapper, mapping circuit or mapping apparatus explained based on the common recognition in the technical field according to the present invention.

According to instructions from the control section 401, the received signal processing section 404 performs reception processing (e.g. demapping, demodulation, decoding and the like) on the DL signal (including at least one of the downlink control channel (L1 control signal) and downlink data channel). The received signal processing section 404 outputs information received from the radio base station 10 to the control section 401. For example, the received signal processing section 404 outputs the broadcast information, system information, control information by higher layer signaling such as RRC signaling, DCI and the like to the control section 401.

The received signal processing section 404 is capable of being comprised of a signal processor, signal processing circuit or signal processing apparatus explained based on the common recognition in the technical field according to the present invention. Further, when the terminal is the Near UE, the received signal processing section 404 may have a canceller such as SIC. When the terminal is the Far UE, the section may have the canceller, or may not have the canceller. Furthermore, the received signal processing section 404 is capable of constituting the decoding section according to the present invention.

The measurement section 405 measures a channel state based on the downlink reference signal (e.g. CRS, CSI-RS) from the radio base station 10, and outputs the measurement result to the control section 401.

The measurement section 405 is capable of being comprised of a signal processor, signal processing circuit or signal processing apparatus and a measurement device, measurement circuit or measurement apparatus explained based on the common recognition in the technical field according to the present invention.

In addition, the block diagrams used in explanation of the above-mentioned Embodiment show blocks on a function-by-function basis. These function blocks (configuration section) are actualized by any combination of hardware and software. Further, the means for actualizing each function block is not limited particularly. In other words, each function block may be actualized by a single physically combined apparatus, or two or more physically separated apparatuses are connected by cable or radio, and each function block may be actualized by a plurality of these apparatuses.

For example, apart or the whole of each of functions of the radio base station 10 and user terminal 20 may be actualized using hardware such as ASIC (Application Specific Integrated Circuit), PLD (Programmable Logic Device), and FPGA (Field Programmable Gate Array). Further, each of the radio base station 10 and user terminal 20 may be actualized by a computer apparatus including a processor (CPU: Central Processing Unit), communication interface for network connection, memory, and computer-readable storage medium holding programs. In other words, the radio base station, user terminal and the like according to one Embodiment of the present invention may function as a computer for performing processing of the radio communication method according to the invention.

Herein, the processor, memory and the like are connected on the bus to communicate information. Further, for example, the computer-readable storage medium is a storage medium such as a flexible disk, magneto-optical disk, ROM (Read Only Memory), EPROM (Erasable Programmable ROM), CD-ROM (Compact Disc-ROM), RAM (Random Access Memory) and hard disk. Furthermore, the program may be transmitted from a network via an electrical communication line. Still furthermore, each of the radio base station 10 and user terminal 20 may include an input apparatus such as input keys and output apparatus such as a display.

The function configurations of the radio base station 10 and user terminal 20 may be actualized by the above-mentioned hardware, may be actualized by software modules executed by the processor, or may be actualized in combination of the hardware and software modules. The processor operates an operating system to control the entire user terminal. Further, the processor reads the program, software module and data from the storage medium onto the memory, and according thereto, executes various kinds of processing.

Herein, it is essential only that the program is a program for causing the computer to execute each operation described in the above-mentioned each Embodiment. For example, the control section 401 of the user terminal 20 may be actualized by a control program stored in the memory to operate by the processor, and the other function blocks may be actualized similarly.

Further, software, command and the like may be transmitted and received via a transmission medium. For example, when software is transmitted from a website, server or another remote source using wired techniques such as a coaxial cable, optical fiber cable, twisted pair and Digital Subscriber Line (DSL) and/or wireless techniques such as infrared, radio wave and microwave, these wired techniques and/or wireless techniques are included in the definition of the transmission medium.

In addition, the term explained in the present Description and/or the term required to understand the present Description may be replaced with a term having the same or similar meaning. For example, the channel and/or symbol may be a signal (signaling). Further, the signal may be a message. Furthermore, a component carrier (CC) may be called a carrier frequency, cell and the like.

Further, the information, parameter and the like explained in the present Description may be expressed by an absolute value, may be expressed by a relative value from a predetermined value, or may be expressed by another corresponding information. For example, the radio resource may be indicated by an index.

The information, signal and the like explained in the present Description may be represented by using any one of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Each Aspect/Embodiment explained in the present Description may be used alone, may be used in combination, or may be switched and used according to execution. Further, notification of predetermined information (e.g. notification of "being X") is not limited to notification that is performed explicitly, and may be performed implicitly (e.g. notification of the predetermined information is not performed.)

Notification of information is not limited to the Aspect/Embodiment explained in the present Description, and may be performed by another method. For example, the notification of information may be performed by physical layer signaling (e.g. DCI (Downlink Control Information), UCI (Uplink Control Information)), higher layer signaling (e.g. RRC (Radio Resource Control) signaling), MAC (Medium Access Control) signaling, broadcast information (MIB (Master Information Block), SIB (System Information Block))), another signal or combination thereof. Further, the RRC signaling may be called an RRC message, and for example, may be an RRC Connection Setup message, RRC Connection Reconfiguration message and the like.

Each Aspect/Embodiment explained in the present Description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (Registered Trademark), system using another proper system and/or the next-generation system extended based thereon.

With respect to the processing procedure, sequence, flowchart and the like of each Aspect/Embodiment explained in the present Description, unless there is a contradiction, the order may be exchanged. For example, with respect to the methods explained in the present Description, elements of various steps are presented by illustrative order, and are not limited to the presented particular order.

As described above, the present invention is specifically described, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2015-186886 filed on Sep. 24, 2015, entire content of which is expressly incorporated by reference herein.

The invention claimed is:

1. A user terminal comprising:
a receiver that receives a downlink (DL) signal to the user terminal; and
a decoder that decodes the DL signal to the user terminal, wherein at least one of a cyclic prefix (CP) length, a symbol length and a transmission time interval (TTI) length is different between the DL signal to the user terminal and a DL signal to another user terminal, and the DL signal to the user terminal and the DL signal to the other user terminal are multiplexed in a power domain, wherein the receiver receives a higher layer control signal indicative of each candidate set configured by including at least one of the CP length, the symbol length and the TTI length, and receives a physical layer control signal indicative of a candidate set applied to the DL signal to the user terminal and/or the DL signal to another user terminal.

2. The user terminal according to claim 1, wherein the receiver receives a physical layer control signal or a higher layer control signal including communication scheme information indicative of at least one of the CP length, the symbol length and the TTI length applied to the DL signal to the user terminal and/or the DL signal to another user terminal.

3. The user terminal according to claim 2, wherein when the DL signal to the user terminal is transmitted with transmit power lower than that of the DL signal to another user terminal, the decoder decodes the DL signal to the user terminal, based on a decoding result of the DL signal to another user terminal, and at least one of the CP length, the symbol length and the TTI length applied to the DL signal to the user terminal.

4. The user terminal according to claim 2, wherein when the DL signal to the user terminal is transmitted with transmit power lower than that of the DL signal to another user terminal, the CP length applied to the DL signal to the user terminal is shorter than the CP length applied to the DL signal to another user terminal.

5. The user terminal according to claim 2, wherein when the DL signal to the user terminal is transmitted with transmit power lower than that of the DL signal to another user terminal, the symbol length applied to the DL signal to the user terminal is longer than the symbol length applied to the DL signal to another user terminal.

6. The user terminal according to claim 1, wherein when the DL signal to the user terminal is transmitted with transmit power lower than that of the DL signal to another user terminal, the decoder decodes the DL signal to the user terminal, based on a decoding result of the DL signal to another user terminal, and at least one of the CP length, the symbol length and the TTI length applied to the DL signal to the user terminal.

7. The user terminal according to claim 6, wherein when the DL signal to the user terminal is transmitted with transmit power lower than that of the DL signal to another user terminal, the CP length applied to the DL signal to the user terminal is shorter than the CP length applied to the DL signal to another user terminal.

8. The user terminal according to claim 6, wherein when the DL signal to the user terminal is transmitted with transmit power lower than that of the DL signal to another user terminal, the symbol length applied to the DL signal to the user terminal is longer than the symbol length applied to the DL signal to another user terminal.

9. The user terminal according to claim 1, wherein when the DL signal to the user terminal is transmitted with transmit power lower than that of the DL signal to another user terminal, the CP length applied to the DL signal to the user terminal is shorter than the CP length applied to the DL signal to another user terminal.

10. The user terminal according to claim 9, wherein when the DL signal to the user terminal is transmitted with transmit power lower than that of the DL signal to another user terminal, the symbol length applied to the DL signal to the user terminal is longer than the symbol length applied to the DL signal to another user terminal.

11. The user terminal according to claim 1, wherein when the DL signal to the user terminal is transmitted with transmit power lower than that of the DL signal to another user terminal, the symbol length applied to the DL signal to the user terminal is longer than the symbol length applied to the DL signal to another user terminal.

12. The user terminal according to claim 11, wherein when the DL signal to the user terminal is transmitted with transmit power lower than that of the DL signal to another user terminal, the symbol length applied to the DL signal to the user terminal is n times the symbol length applied to the DL signal to another user terminal and n is a positive integer.

13. The user terminal according to claim 12, wherein the another user terminal multiplexed with the user terminal in the power domain is a plurality of user terminals, and the plurality of user terminals is multiplexed in a time domain.

14. The user terminal according to claim 11, wherein the another user terminal multiplexed with the user terminal in the power domain is a plurality of user terminals, and the plurality of user terminals is multiplexed in a time domain.

15. A radio base station comprising:
   a transmitter that transmits a downlink (DL) signal to a user terminal; and
   a processor that controls transmission of the DL signal to the user terminal,
   wherein the processor controls so that at least one of a cyclic prefix (CP) length, a symbol length and a transmission time interval (TTI) length is different between the DL signal to the user terminal and a DL signal to another user terminal, and
   the DL signal to the user terminal and the DL signal to the other user terminal are multiplexed in a power domain,
   wherein the user terminal receives a higher layer control signal indicative of each candidate set configured by including at least one of the CP length, the symbol length and the TTI length, and receives a physical layer control signal indicative of a candidate set applied to the DL signal to the user terminal and/or the DL signal to another user terminal.

16. A radio communication method in a user terminal and a radio base station, comprising:
   in the user terminal,
   receiving a downlink (DL) signal to the user terminal; and
   decoding the DL signal to the user terminal,
   wherein at least one of a cyclic prefix (CP) length, a symbol length and a transmission time interval (TTI) length is different between the DL signal to the user terminal and a DL signal to another user terminal, and
   the DL signal to the user terminal and the DL signal to the other user terminal are multiplexed in a power domain,
   wherein the user terminal receives a higher layer control signal indicative of each candidate set configured by including at least one of the CP length, the symbol length and the TTI length, and receives a physical layer control signal indicative of a candidate set applied to the DL signal to the user terminal and/or the DL signal to another user terminal.

\* \* \* \* \*